US012696166B2

(12) United States Patent
Cheng et al.

(10) Patent No.: US 12,696,166 B2
(45) Date of Patent: Jul. 28, 2026

(54) CONDITIONAL HANDOVER BETWEEN DIRECT AND SIDELINK PATH SWITCH

(71) Applicant: QUALCOMM Incorporated, San Diego, CA (US)

(72) Inventors: Peng Cheng, Beijing (CN); Karthika Paladugu, Hyderabad (IN); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 18/693,863

(22) PCT Filed: Nov. 17, 2021

(86) PCT No.: PCT/CN2021/131160
§ 371 (c)(1),
(2) Date: Mar. 20, 2024

(87) PCT Pub. No.: WO2023/087174
PCT Pub. Date: May 25, 2023

(65) Prior Publication Data
US 2024/0388987 A1      Nov. 21, 2024

(51) Int. Cl.
*H04W 36/36*          (2009.01)
*H04W 36/00*          (2009.01)

(52) U.S. Cl.
CPC ... *H04W 36/362* (2023.05); *H04W 36/00835* (2018.08); *H04W 36/033* (2023.05)

(58) Field of Classification Search
CPC ......... H04W 36/362; H04W 36/00835; H04W 36/033; H04W 36/0033; H04W 36/0061; H04W 88/04
(Continued)

(56) References Cited

U.S. PATENT DOCUMENTS 9,107,115 B2 * 8/2015 Aminaka .......... H04W 36/0058
10,512,037 B1 * 12/2019 Sung ..................... H04W 48/02
(Continued)

FOREIGN PATENT DOCUMENTS

CN          108632919 A          10/2018
CN          110611940 A          12/2019
(Continued)

OTHER PUBLICATIONS

3GPP: "3rd Generation Partnership Project, Technical Specification Group Radio Access Network, Study on NR sidelink relay, (Release 17)", 3GPP Organizational Partners, Sophia Antipolis Valbonne, France, 3GPP TR 38.836 V17.0.0 (Mar. 2021), Mar. 2021, pp. 10-16, 26 pages.
(Continued)

*Primary Examiner* — Don N Vo
(74) *Attorney, Agent, or Firm* — Holland & Hart LLP

(57) ABSTRACT

Methods, systems, and devices for wireless communication are described. A user equipment (UE) may receive a signal indicating respective execution conditions for a conditional handover (CHO) procedure for each of one or more candidate handover groups, the one or more candidate handover groups comprising a candidate cell group and a candidate relay group, and each candidate handover group associated with a different priority level. The UE may select a handover candidate for performing the CHO procedure based at least in part on determining that the respective execution condition is satisfied for one or more handover candidates of the one or more candidate handover groups and on the respective priority levels of the one or more candidate handover groups. The UE may perform the CHO procedure to the selected handover candidate.

22 Claims, 21 Drawing Sheets

(58) Field of Classification Search
    USPC ........................................................ 455/437
    See application file for complete search history.

(56)                    References Cited

U.S. PATENT DOCUMENTS

| | | | | |
|---|---|---|---|---|
| 12,294,897 | B2 * | 5/2025 | Wang ................ | H04W 36/0058 |
| 2019/0313315 | A1 * | 10/2019 | Xu ......................... | H04W 24/10 |
| 2020/0059980 | A1 | 2/2020 | Hong et al. | |
| 2021/0315057 | A1 * | 10/2021 | Baek ..................... | H04W 76/10 |
| 2021/0377830 | A1 | 12/2021 | Jin et al. | |
| 2022/0030484 | A1 | 1/2022 | Cheng et al. | |
| 2024/0306059 | A1 * | 9/2024 | Zhang ................ | H04W 36/033 |
| 2024/0357446 | A1 * | 10/2024 | Tao ..................... | H04W 36/362 |

FOREIGN PATENT DOCUMENTS

| | | |
|---|---|---|
| CN | 113508617 A | 10/2021 |
| WO | WO-2020076016 A1 | 4/2020 |

OTHER PUBLICATIONS

CATT: "Discussion on UE Behavior When More than One Candidate Cell Meets the Condition", R2-1906645, Revision of R2-1903353, 3rd Generation Partnership Project, Mobile Competence Centre, 650, Route Des Lucioles, F-06921 Sophia-antipolis Cedex, France, vol. RAN WG2, No. Reno, USA, May 13, 2019-May 17, 2019, May 2, 2019, XP051710955, 2 Pages, chapters 1, 2.

Qualcomm Incorporated: "Service continuity of L2 U2N relay", R2-2104739, 3rd Generation Partnership Project, Mobile Competence Centre, 650, Route Des Lucioles, F-06921 Sophia-antipolis Cedex, France, vol. RAN WG2, No. E-Conference, May 19, 2021-May 27, 2021, May 11, 2021, 12 Pages, XP052006503, chapters 1, 2.

Supplementary Partial European Search Report—EP21964337—Search Authority—Munich—Jul. 3, 2025.

ZTE Corporation, et al., "Discussion on SL relay service continuity", R2-2108147, 3rd Generation Partnership Project, Mobile Competence Centre, 650, Route Des Lucioles, F-06921 Sophia-antipolis Cedex, France, vol. RAN WG2, No. electronic, Aug. 9, 2021-Aug. 27, 2021, Aug. 6, 2021, 9 Pages, XP052034650, chapters 1, 2.

International Search Report and Written Opinion—PCT/CN2021/131160—ISA/EPO—Apr. 26, 2022.

Fujitsu: "Topology Adaptation Enhancements", 3GPP TSG-RAN WG2 Meeting #113bis electronic, R2-2103284, 3rd Generation Partnership Project (3GPP), Mobile Competence Centre, 650, Route Des Lucioles, F-06921 Sophia-Antipolis Cedex, France , vol. RAN WG2, No. electronic, Apr. 12, 2021-Apr. 20, 2021, Apr. 2, 2021, 9 Pages, XP052174872, Chapters 1, 2.

Supplementary European Search Report EP21964337 Search Authority Munich Oct. 28, 2025.

ZTE: "Discussion on Reduction of Service Interruption, Intra-donor CHO and RLF", 3GPP TSG-RAN WG3 #112-e, R3-212038, 3rd Generation Partnership Project (3GPP), Mobile Competence Centre, 650, Route Des Lucioles, F-06921 Sophia-Antipolis Cedex, France, vol. RAN WG3, No. Online, May 17, 2021-May 27, 2021, May 7, 2021, 11 Pages, XP052002282, chapters 1, 3.

* cited by examiner

FIG. 3        300

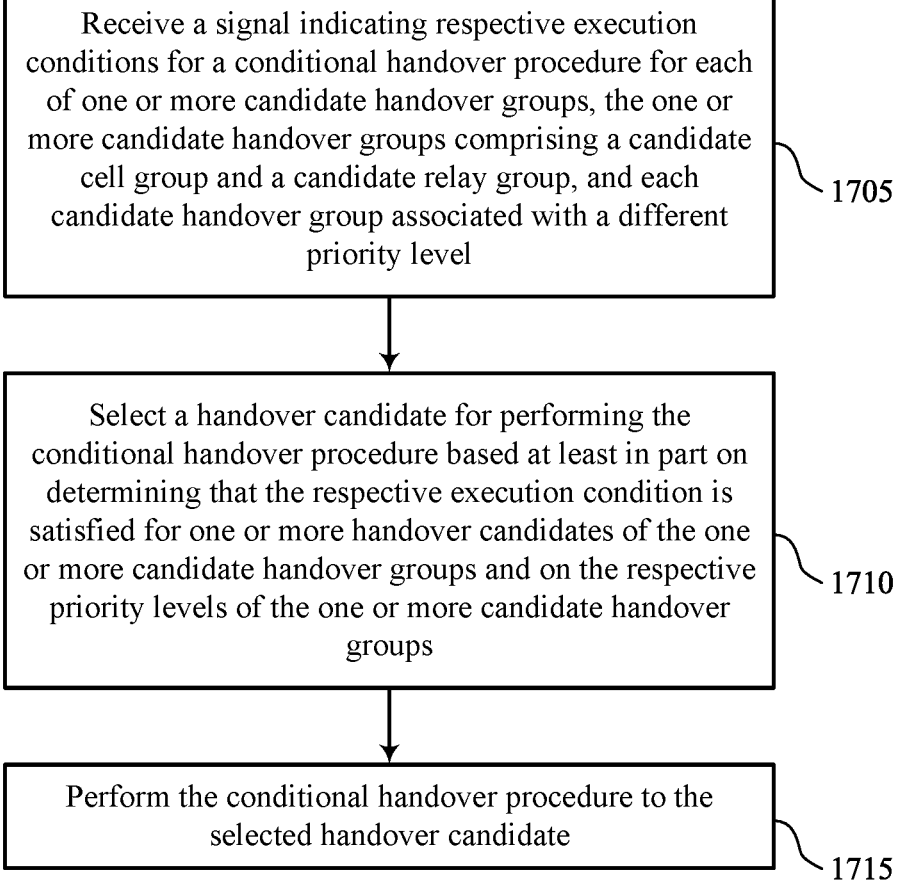

Receive a signal indicating respective execution conditions for a conditional handover procedure for each of one or more candidate handover groups, the one or more candidate handover groups comprising a candidate cell group and a candidate relay group, and each candidate handover group associated with a different priority level

1705

Select a handover candidate for performing the conditional handover procedure based at least in part on determining that the respective execution condition is satisfied for one or more handover candidates of the one or more candidate handover groups and on the respective priority levels of the one or more candidate handover groups

1710

Perform the conditional handover procedure to the selected handover candidate

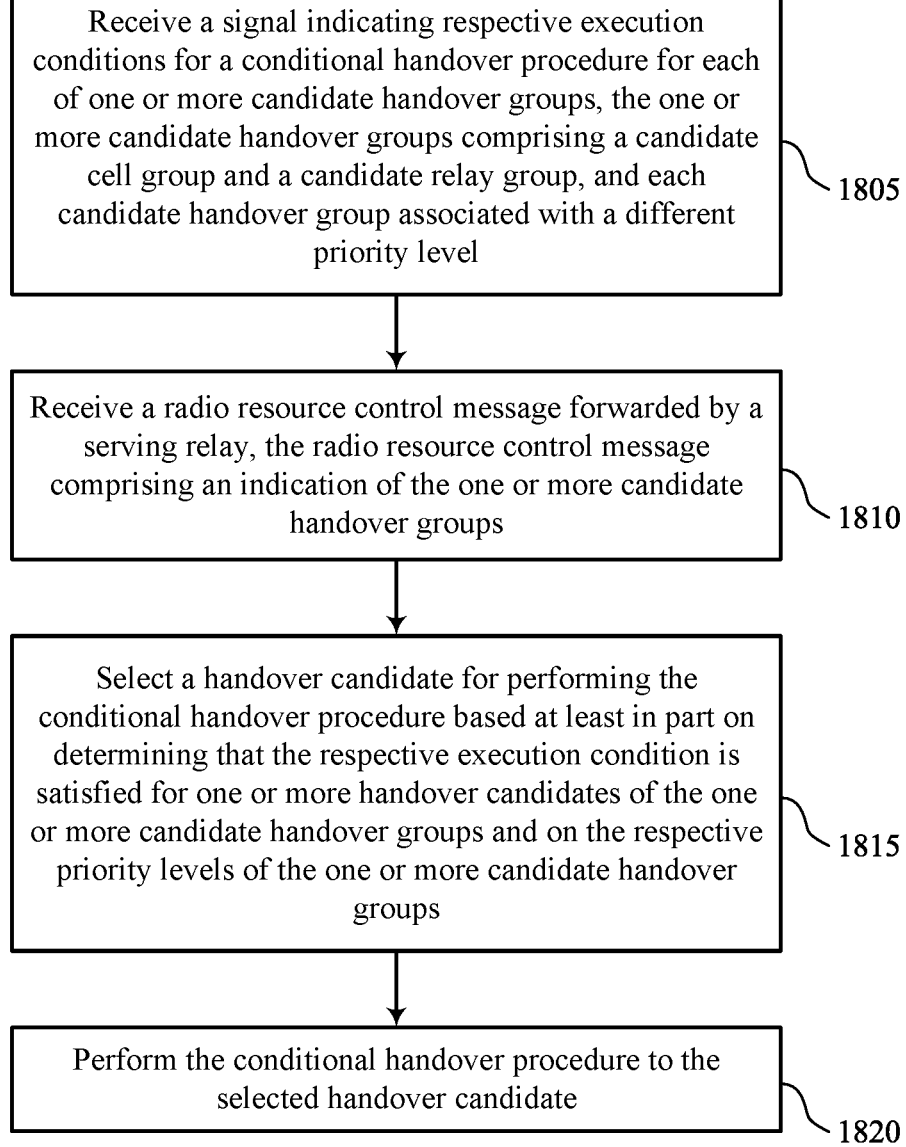

Receive a signal indicating respective execution conditions for a conditional handover procedure for each of one or more candidate handover groups, the one or more candidate handover groups comprising a candidate cell group and a candidate relay group, and each candidate handover group associated with a different priority level

1805

Receive a radio resource control message forwarded by a serving relay, the radio resource control message comprising an indication of the one or more candidate handover groups

1810

Select a handover candidate for performing the conditional handover procedure based at least in part on determining that the respective execution condition is satisfied for one or more handover candidates of the one or more candidate handover groups and on the respective priority levels of the one or more candidate handover groups

1815

Perform the conditional handover procedure to the selected handover candidate

Figure 19:
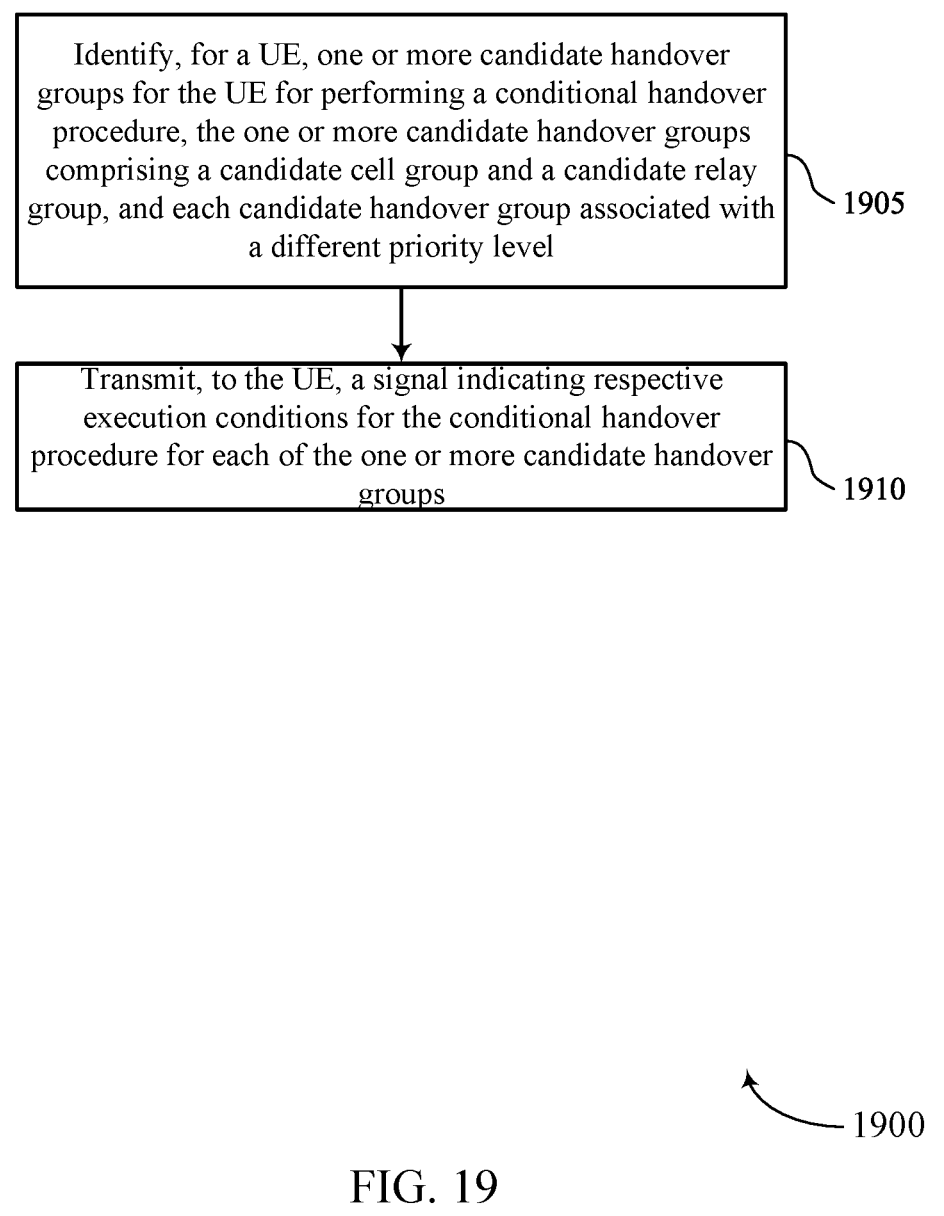

Identify, for a UE, one or more candidate handover groups for the UE for performing a conditional handover procedure, the one or more candidate handover groups comprising a candidate cell group and a candidate relay group, and each candidate handover group associated with a different priority level ⟍ 1905

Transmit, to the UE, a signal indicating respective execution conditions for the conditional handover procedure for each of the one or more candidate handover groups ⟍ 1910

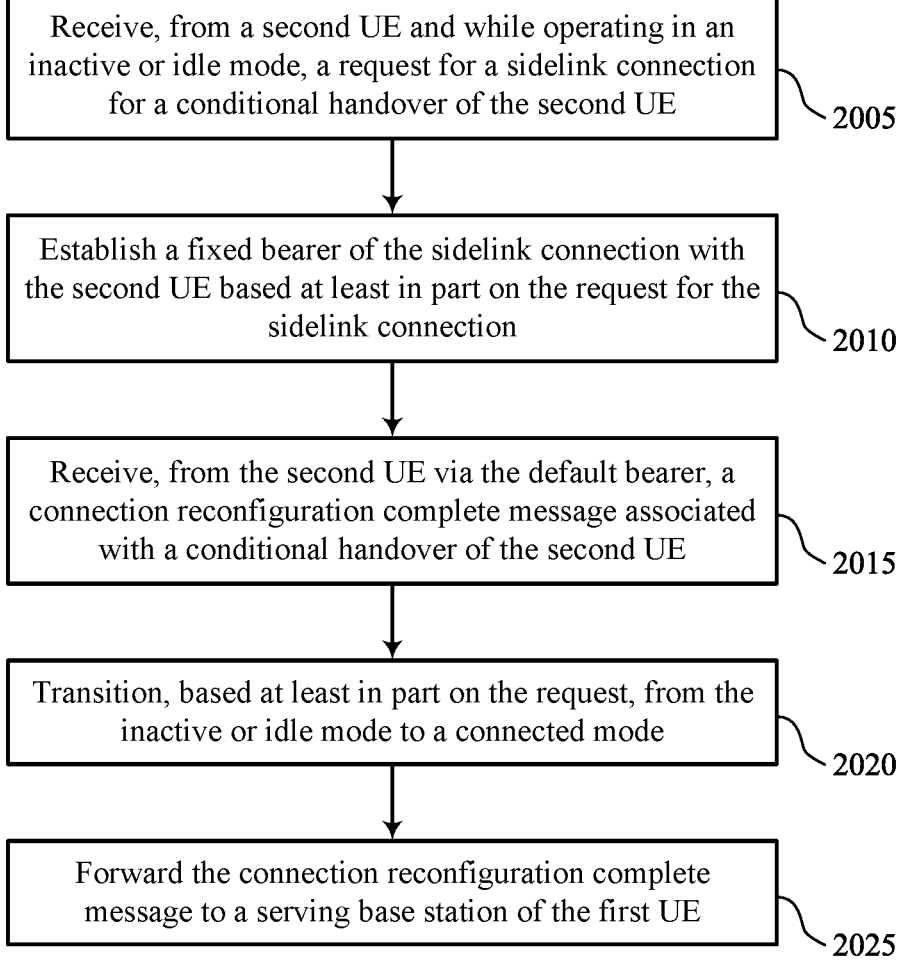

Receive, from a second UE and while operating in an inactive or idle mode, a request for a sidelink connection for a conditional handover of the second UE

2005

Establish a fixed bearer of the sidelink connection with the second UE based at least in part on the request for the sidelink connection

2010

Receive, from the second UE via the default bearer, a connection reconfiguration complete message associated with a conditional handover of the second UE

2015

Transition, based at least in part on the request, from the inactive or idle mode to a connected mode

2020

Forward the connection reconfiguration complete message to a serving base station of the first UE

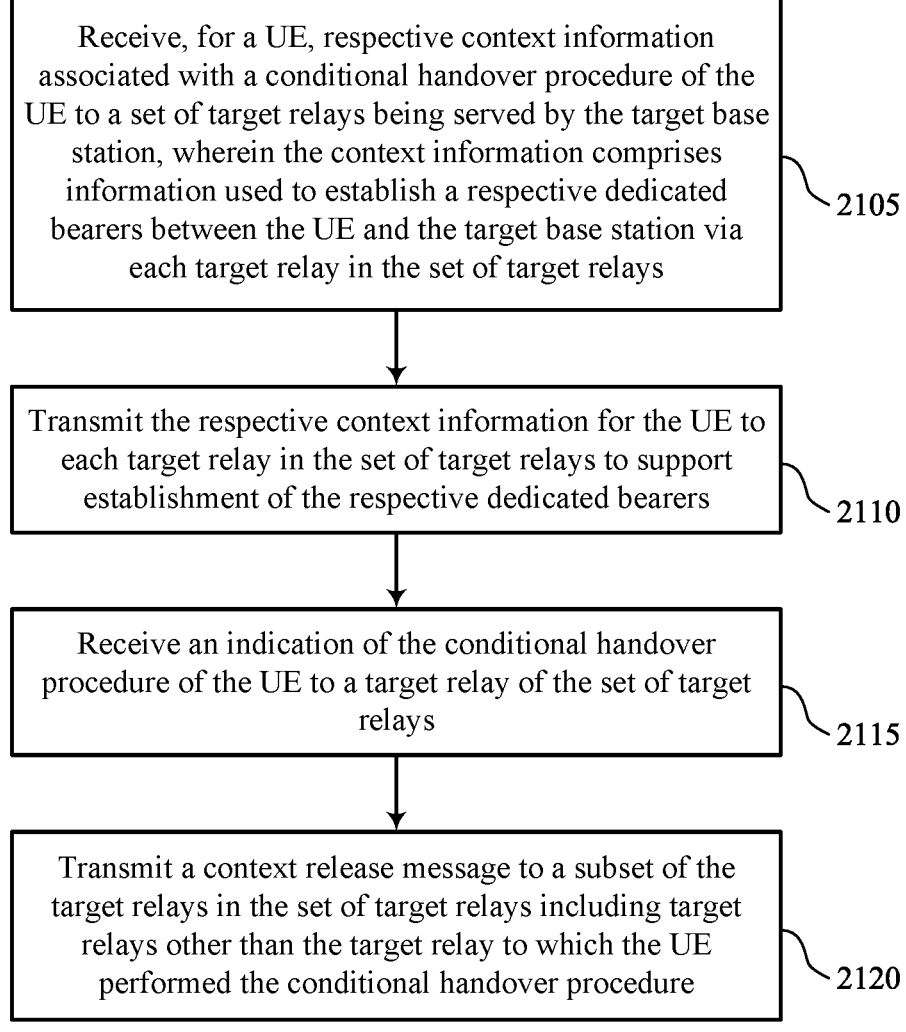

Receive, for a UE, respective context information associated with a conditional handover procedure of the UE to a set of target relays being served by the target base station, wherein the context information comprises information used to establish a respective dedicated bearers between the UE and the target base station via each target relay in the set of target relays

2105

Transmit the respective context information for the UE to each target relay in the set of target relays to support establishment of the respective dedicated bearers

2110

Receive an indication of the conditional handover procedure of the UE to a target relay of the set of target relays

2115

Transmit a context release message to a subset of the target relays in the set of target relays including target relays other than the target relay to which the UE performed the conditional handover procedure

CONDITIONAL HANDOVER BETWEEN DIRECT AND SIDELINK PATH SWITCH

CROSS REFERENCE

The present Application is a 371 national stage filing of International PCT Application No. PCT/CN2021/131160 by CHENG et al. entitled "CONDITIONAL HANDOVER BETWEEN DIRECT AND SIDELINK PATH SWITCH," filed Nov. 17, 2021, which is assigned to the assignee hereof, and which is expressly incorporated by reference in its entirety herein.

FIELD OF TECHNOLOGY

The following relates to wireless communication, including conditional handover between direct and sidelink path switch.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support conditional handover between direct and sidelink path switch. Generally, the described techniques provide for a user equipment (UE) being configured with multiple candidate or target handover groups (e.g., conditional handover (CHO) groups) and selecting a candidate for a conditional handover based on the priority level of the candidate handover group. For example, a serving base station of the UE may identify CHO groups for the UE and transmit signaling (e.g., via radio resource control (RRC) signaling) to the UE indicating or otherwise identifying execution conditions for each CHO group (e.g., in the signaling configuring the CHO groups). The CHO groups may include at least one candidate relay group and may include at least one candidate cell group. Each CHO group may also be associated with a respective priority level. The UE may, upon an execution condition is met, select a handover candidate from one of the CHO groups based on the CHO group priority level. The UE may perform the CHO to the handover candidate (e.g., a candidate relay or a candidate base station) to establish a new cell or sidelink connection.

A method for wireless communication at a UE is described. The method may include receiving a signal indicating respective execution conditions for a CHO procedure for each of one or more candidate handover groups, the one or more candidate handover groups including a candidate cell group and a candidate relay group, and each candidate handover group associated with a different priority level, selecting a handover candidate for performing the CHO procedure based on determining that the respective execution condition is satisfied for one or more handover candidates of the one or more candidate handover groups and on the respective priority levels of the one or more candidate handover groups, and performing the CHO procedure to the selected handover candidate.

An apparatus for wireless communication at a UE is described. The apparatus may include a processor, memory coupled with the processor, and instructions stored in the memory. The instructions may be executable by the processor to cause the apparatus to receive a signal indicating respective execution conditions for a CHO procedure for each of one or more candidate handover groups, the one or more candidate handover groups including a candidate cell group and a candidate relay group, and each candidate handover group associated with a different priority level, select a handover candidate for performing the CHO procedure based on determining that the respective execution condition is satisfied for one or more handover candidates of the one or more candidate handover groups and on the respective priority levels of the one or more candidate handover groups, and perform the CHO procedure to the selected handover candidate.

Another apparatus for wireless communication at a UE is described. The apparatus may include means for receiving a signal indicating respective execution conditions for a CHO procedure for each of one or more candidate handover groups, the one or more candidate handover groups including a candidate cell group and a candidate relay group, and each candidate handover group associated with a different priority level, means for selecting a handover candidate for performing the CHO procedure based on determining that the respective execution condition is satisfied for one or more handover candidates of the one or more candidate handover groups and on the respective priority levels of the one or more candidate handover groups, and means for performing the CHO procedure to the selected handover candidate.

A non-transitory computer-readable medium storing code for wireless communication at a UE is described. The code may include instructions executable by a processor to receive a signal indicating respective execution conditions for a CHO procedure for each of one or more candidate handover groups, the one or more candidate handover groups including a candidate cell group and a candidate relay group, and each candidate handover group associated with a different priority level, select a handover candidate for performing the CHO procedure based on determining that the respective execution condition is satisfied for one or more handover candidates of the one or more candidate handover groups and on the respective priority levels of the one or more candidate handover groups, and perform the CHO procedure to the selected handover candidate.

In some examples of the method, apparatuses, and non-transitory computer-readable medium described herein, receiving+ a RRC message forwarded by a serving relay, the RRC message including an indication of the one or more candidate handover groups.

Some examples of the method, apparatuses, and non-transitory computer-readable medium described herein may further include operations, features, means, or instructions for identifying, based on the indication, a first execution condition of the respective execution conditions for the candidate cell group and a second execution condition of the respective execution conditions for the candidate relay group, where the first execution condition may be associated with a first measurement event and the second execution condition may be associated with a second, different measurement event.

Some examples of the method, apparatuses, and non-transitory computer-readable medium described herein may further include operations, features, means, or instructions for identifying, based on the indication, a first priority level for the candidate cell group and a second priority level for the candidate relay group.

Some examples of the method, apparatuses, and non-transitory computer-readable medium described herein may further include operations, features, means, or instructions for identifying, based on monitoring a signal from one or more handover candidates in the one or more candidate handover groups, a receive power level for each of the one or more handover candidates and determining that the respective execution condition may be satisfied based on the receive power level of the one or more handover candidates satisfying a threshold.

Some examples of the method, apparatuses, and non-transitory computer-readable medium described herein may further include operations, features, means, or instructions for determining, based on monitoring for a sidelink discovery reference signal, that the receive power level for one or more relays of the candidate relay group satisfy the threshold, where the CHO may be performed based on the receive power level for the one or more relays satisfying the threshold.

Some examples of the method, apparatuses, and non-transitory computer-readable medium described herein may further include operations, features, means, or instructions for determining that the receive power level for a serving cell fails to satisfy a serving cell threshold, where the CHO may be performed based on the receive power level for the one or more relays satisfying the threshold and the receive power for the serving cell failing to satisfy the serving cell threshold.

Some examples of the method, apparatuses, and non-transitory computer-readable medium described herein may further include operations, features, means, or instructions for determining, based on monitoring for a sidelink discovery reference signal, that the receive power level for a serving relay fails to satisfy a serving relay threshold, where the CHO may be performed based on the receive power level for the serving relay failing to satisfying the serving relay threshold.

Some examples of the method, apparatuses, and non-transitory computer-readable medium described herein may further include operations, features, means, or instructions for determining, based on monitoring for a reference signal, that the receive power level for one or more handover candidates satisfy a threshold, where the CHO may be performed based on the receive power level for the serving relay failing to satisfy the serving relay threshold and the receive power for the one or more handover candidates satisfying the threshold.

Some examples of the method, apparatuses, and non-transitory computer-readable medium described herein may further include operations, features, means, or instructions for determining, based on monitoring for a sidelink reference signal, that the receive power level for a serving relay fails to satisfy a serving relay threshold and determining, based on monitoring for a sidelink discovery reference signal, that the receive power level for a candidate relay of the candidate relay group satisfies a threshold, where the CHO may be performed based on the receive power level for the serving relay failing to satisfy the serving relay threshold and the receive power level for the candidate relay satisfying the threshold.

Some examples of the method, apparatuses, and non-transitory computer-readable medium described herein may further include operations, features, means, or instructions for refraining, based on the respective execution condition being satisfied, from performing transmissions to a source cell via a serving relay and transmitting, to a target cell associated with a selected candidate relay, a handover complete message based on the CHO procedure being performed.

In some examples of the method, apparatuses, and non-transitory computer-readable medium described herein, the handover complete message may be transmitted to the target cell via the selected candidate relay while the selected candidate relay may be operating in a connected mode, and the handover complete message may be transmitted over a dedicated sidelink bearer from the source cell.

In some examples of the method, apparatuses, and non-transitory computer-readable medium described herein, the handover complete message may be transmitted to the selected candidate relay for relaying to the target cell while the selected candidate relay may be operating in an idle mode or an inactive mode, and the handover complete message may be transmitted over a fixed sidelink bearer.

A method for wireless communication at a serving base station is described. The method may include identifying, for a UE, one or more candidate handover groups for the UE for performing a CHO procedure, the one or more candidate handover groups including a candidate cell group and a candidate relay group, and each candidate handover group associated with a different priority level and transmitting, to the UE, a signal indicating respective execution conditions for the CHO procedure for each of the one or more candidate handover groups.

An apparatus for wireless communication at a serving base station is described. The apparatus may include a processor, memory coupled with the processor, and instructions stored in the memory. The instructions may be executable by the processor to cause the apparatus to identify, for a UE, one or more candidate handover groups for the UE for performing a CHO procedure, the one or more candidate handover groups including a candidate cell group and a candidate relay group, and each candidate handover group associated with a different priority level and transmit, to the UE, a signal indicating respective execution conditions for the CHO procedure for each of the one or more candidate handover groups.

Another apparatus for wireless communication at a serving base station is described. The apparatus may include means for identifying, for a UE, one or more candidate handover groups for the UE for performing a CHO procedure, the one or more candidate handover groups including a candidate cell group and a candidate relay group, and each candidate handover group associated with a different priority level and means for transmitting, to the UE, a signal indicating respective execution conditions for the CHO procedure for each of the one or more candidate handover groups.

A non-transitory computer-readable medium storing code for wireless communication at a serving base station is described. The code may include instructions executable by a processor to identify, for a UE, one or more candidate handover groups for the UE for performing a CHO proce- dure, the one or more candidate handover groups including a candidate cell group and a candidate relay group, and each candidate handover group associated with a different priority level and transmit, to the UE, a signal indicating respective execution conditions for the CHO procedure for each of the one or more candidate handover groups.

In some examples of the method, apparatuses, and non- transitory computer-readable medium described herein, the candidate relay group includes one or more candidate relays and the method, apparatuses, and non-transitory computer- readable medium may include further operations, features, means, or instructions for sending, to a serving base station of the one or more candidate relays for forwarding to the one or more candidate relays and based on the one or more candidate relays operating in a connected mode, an identifier of the UE, an identifier of a serving cell, and a dedicated bearer configuration for a relay connection for the UE with the serving cell.

In some examples of the method, apparatuses, and non- transitory computer-readable medium described herein, the candidate relay group includes one or more candidate relays and the method, apparatuses, and non-transitory computer- readable medium may include further operations, features, means, or instructions for transmitting, to a serving base station of the one or more candidate relays and based on the one or more candidate relays operating in an inactive mode or an idle mode, an identifier of the UE and an identifier of a serving cell.

A method for wireless communication at a first UE is described. The method may include receiving, from a sec- ond UE and while operating in an inactive or idle mode, a request for a sidelink connection for a CHO of the second UE, establishing a fixed bearer of the sidelink connection with the second UE based on the request for the sidelink connection, receiving, from the second UE via the fixed bearer, a connection reconfiguration complete message asso- ciated with a CHO of the second UE, transitioning, based on the request, from the inactive or idle mode to a connected mode, and forwarding the connection reconfiguration com- plete message to a serving base station of the first UE.

An apparatus for wireless communication at a first UE is described. The apparatus may include a processor, memory coupled with the processor, and instructions stored in the memory. The instructions may be executable by the proces- sor to cause the apparatus to receive, from a second UE and while operating in an inactive or idle mode, a request for a sidelink connection for a CHO of the second UE, establish a fixed bearer of the sidelink connection with the second UE based on the request for the sidelink connection, receive, from the second UE via the fixed bearer, a connection reconfiguration complete message associated with a CHO of the second UE, transition, based on the request, from the inactive or idle mode to a connected mode, and forward the connection reconfiguration complete message to a serving base station of the first UE.

Another apparatus for wireless communication at a first UE is described. The apparatus may include means for receiving, from a second UE and while operating in an inactive or idle mode, a request for a sidelink connection for a CHO of the second UE, means for establishing a fixed bearer of the sidelink connection with the second UE based on the request for the sidelink connection, means for receiving, from the second UE via the fixed bearer, a connection reconfiguration complete message associated with a CHO of the second UE, means for transitioning, based on the request, from the inactive or idle mode to a connected mode, and means for forwarding the connection reconfiguration complete message to a serving base station of the first UE.

A non-transitory computer-readable medium storing code for wireless communication at a first UE is described. The code may include instructions executable by a processor to receive, from a second UE and while operating in an inactive or idle mode, a request for a sidelink connection for a CHO of the second UE, establish a fixed bearer of the sidelink connection with the second UE based on the request for the sidelink connection, receive, from the second UE via the fixed bearer, a connection reconfiguration complete message associated with a CHO of the second UE, transition, based on the request, from the inactive or idle mode to a connected mode, and forward the connection reconfiguration complete message to a serving base station of the first UE.

In some examples of the method, apparatuses, and non- transitory computer-readable medium described herein, relaying, base at least in part on the CHO of the second UE, data between the second UE and the serving base station of the first UE.

A method for wireless communication at a target base station is described. The method may include receiving, for a UE, respective context information associated with a CHO procedure of the UE to a set of target relays being served by the target base station, where the context information includes information used to establish a respective dedicated bearers between the UE and the target base station via each target relay in the set of target relays, transmitting the respective context information for the UE to each target relay in the set of target relays to support establishment of the respective dedicated bearers, receiving an indication of the CHO procedure of the UE to a target relay of the set of target relays, and transmitting a context release message to a subset of the target relays in the set of target relays including target relays other than the target relay to which the UE performed the CHO procedure.

An apparatus for wireless communication at a target base station is described. The apparatus may include a processor, memory coupled with the processor, and instructions stored in the memory. The instructions may be executable by the processor to cause the apparatus to receive, for a UE, respective context information associated with a CHO pro- cedure of the UE to a set of target relays being served by the target base station, where the context information includes information used to establish a respective dedicated bearers between the UE and the target base station via each target relay in the set of target relays, transmit the respective context information for the UE to each target relay in the set of target relays to support establishment of the respective dedicated bearers, receive an indication of the CHO proce- dure of the UE to a target relay of the set of target relays, and transmit a context release message to a subset of the target relays in the set of target relays including target relays other than the target relay to which the UE performed the CHO procedure.

Another apparatus for wireless communication at a target base station is described. The apparatus may include means for receiving, for a UE, respective context information associated with a CHO procedure of the UE to a set of target relays being served by the target base station, where the context information includes information used to establish a respective dedicated bearers between the UE and the target base station via each target relay in the set of target relays, means for transmitting the respective context information for the UE to each target relay in the set of target relays to support establishment of the respective dedicated bearers, means for receiving an indication of the CHO procedure of the UE to a target relay of the set of target relays, and means for transmitting a context release message to a subset of the target relays in the set of target relays including target relays other than the target relay to which the UE performed the CHO procedure.

A non-transitory computer-readable medium storing code for wireless communication at a target base station is described. The code may include instructions executable by a processor to receive, for a UE, respective context information associated with a CHO procedure of the UE to a set of target relays being served by the target base station, where the context information includes information used to establish a respective dedicated bearers between the UE and the target base station via each target relay in the set of target relays, transmit the respective context information for the UE to each target relay in the set of target relays to support establishment of the respective dedicated bearers, receive an indication of the CHO procedure of the UE to a target relay of the set of target relays, and transmit a context release message to a subset of the target relays in the set of target relays including target relays other than the target relay to which the UE performed the CHO procedure.

Some examples of the method, apparatuses, and non-transitory computer-readable medium described herein may further include operations, features, means, or instructions for determining that a first target relay in the subset of the target relays may be operating in a connected mode, where the context release message may be transmitted based on the first target relay operating in the connected mode.

Some examples of the method, apparatuses, and non-transitory computer-readable medium described herein may further include operations, features, means, or instructions for determining that a first target relay in the subset of the target relays may be operating in a connected mode, where the context release message may be transmitted based on the first target relay operating in the connected mode.

Some examples of the method, apparatuses, and non-transitory computer-readable medium described herein may further include operations, features, means, or instructions for determining that the target relay may be operating in an inactive or idle mode and receiving a connection reconfiguration complete message from the target relay via a fixed bearer between the target base station and target relay, where the connection reconfiguration complete message may be received via the fixed bearer based on the target relay operating in the inactive or idle mode.

BRIEF DESCRIPTION OF THE DRAWINGS

FIGS. 17 through 21 show flowcharts illustrating methods that support conditional handover between direct and sidelink path switch in accordance with aspects of the present disclosure.

DETAILED DESCRIPTION

User equipment (UE) may generally be configured with up to eight conditional handover (CHO) candidates for a CHO procedure. The configuration may include one or more execution conditions identifying which condition(s) qualify for the UE to initiate the CHO procedure to a candidate. The configuration may also provide candidate cell configurations for each CHO candidate. Upon an execution condition being met, the UE initiates the CHO procedure to a candidate. However, such techniques may not include support for a conditional path switch from a cell (e.g., a Uu interface) to sidelink (e.g., a PC5 interface) link, from a sidelink to a sidelink/cell link, and/or provide techniques for failure handling when target relays are configured as CHO candidates.

Generally, the described techniques provide for a UE being configured with multiple candidate or target handover groups (e.g., CHO groups) and selecting a candidate for a conditional handover based on the priority level of the candidate handover group. For example, a serving base station of the UE may identify CHO groups for the UE and transmit signaling (e.g., via radio resource control (RRC) signaling) to the UE indicating or otherwise identifying execution conditions for each CHO group (e.g., in the signaling configuring the CHO groups). The CHO groups may include at least one candidate relay group and at least one candidate cell group. Each CHO group may also be associated with a respective priority level. The UE may, upon an execution condition is met, select a handover candidate from one of the CHO groups based on the CHO group priority level. The UE may perform the CHO to the handover candidate (e.g., a candidate relay or a candidate base station) to establish a new cell or sidelink connection.

Aspects of the disclosure are initially described in the context of wireless communications systems. Aspects of the disclosure are further illustrated by and described with reference to apparatus diagrams, system diagrams, and flowcharts that relate to conditional handover between direct and sidelink path switch.

Figure 1:
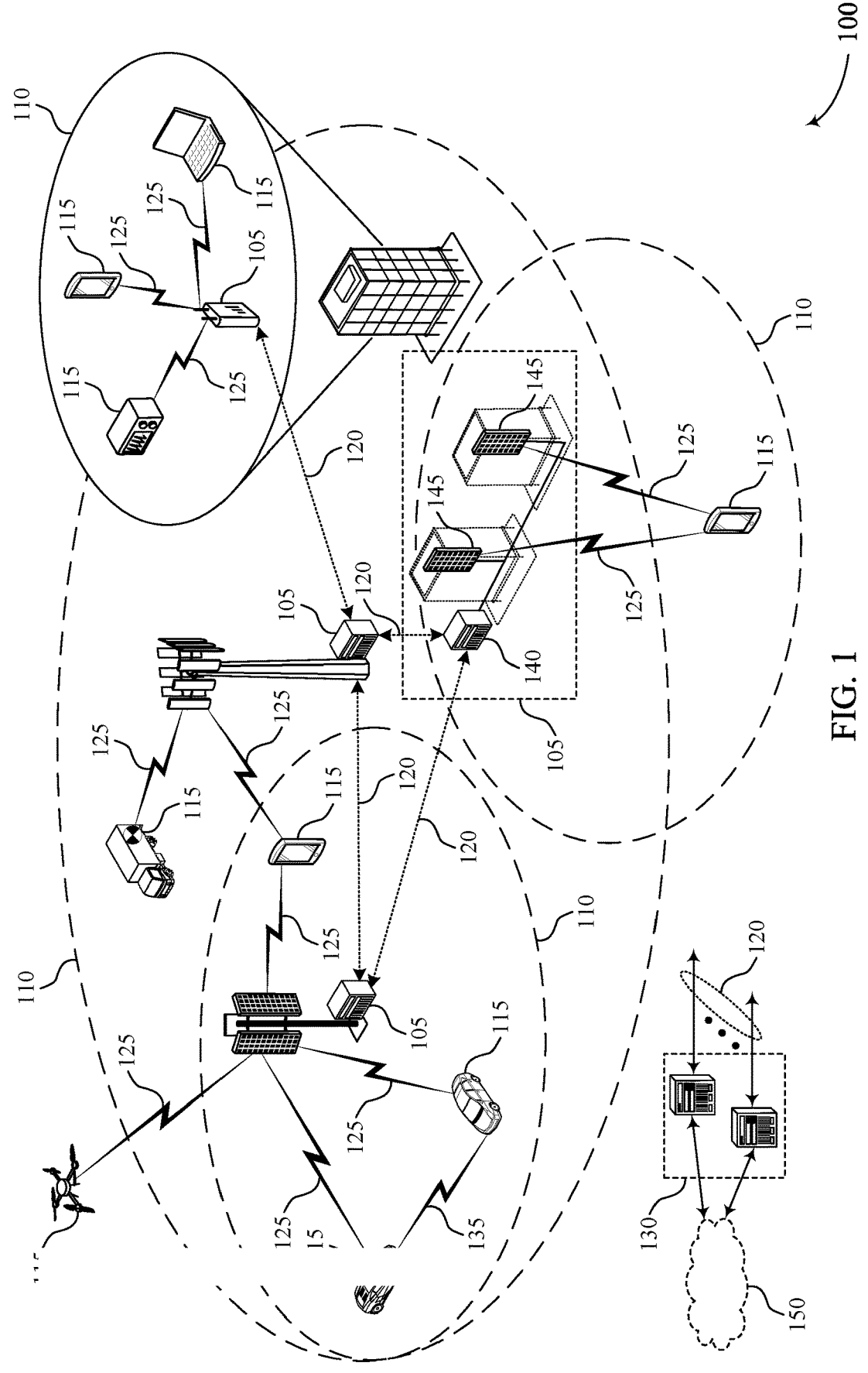
FIG. 1 illustrates an example of a wireless communications system that supports conditional handover between direct and sidelink path switch in accordance with aspects of the present disclosure.

FIG. 1 illustrates an example of a wireless communications system 100 that supports conditional handover between direct and sidelink path switch in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a ULE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a signal indicating respective execution conditions for a CHO procedure for each of one or more candidate handover groups, the one or more candidate handover groups comprising a candidate cell group and a candidate relay group, and each candidate handover group associated with a different priority level. The UE 115 may select a handover candidate for performing the CHO procedure based at least in part on determining that the respective execution condition is satisfied for one or more handover candidates of the one or more candidate handover groups and on the respective priority levels of the one or more candidate handover groups. The UE 115 may perform the CHO procedure to the selected handover candidate.

A base station 105 (e.g., a serving base station) may identify, for a UE 115, one or more candidate handover groups for the UE 115 for performing a CHO procedure, the one or more candidate handover groups comprising a candidate cell group and a candidate relay group, and each candidate handover group associated with a different priority level. The base station 105 may transmit, to the UE 115, a signal indicating respective execution conditions for the CHO procedure for each of the one or more candidate handover groups.

A UE 115 (e.g., a first UE) may receive, from a second UE and while operating in an inactive or idle mode, a request for a sidelink connection for a CHO of the second UE. The UE 115 may establish a fixed bearer of the sidelink connection with the second UE based at least in part on the request for the sidelink connection. The UE 115 may receive, from the second UE via the fixed bearer, a connection reconfiguration complete message associated with a CHO of the second UE. The UE 115 may transition, based at least in part on the request, from the inactive or idle mode to a connected mode. The UE 115 may forward the connection reconfiguration complete message to a serving base station of the first UE.

A base station 105 (e.g., a target base station) may receive, for a UE 115, respective context information associated with a CHO procedure of the UE 115 to a set of target relays being served by the target base station, where the context information may include information used to establish respective dedicated bearers between the UE 115 and the target base station via each target relay in the set of target relays. The base station 105 may transmit the respective context information for the UE 115 to each target relay in the set of target relays to support establishment of the respective dedicated bearers. The base station 105 may receive an indication of the CHO procedure of the UE 115 to a target relay of the set of target relays. The base station 105 may transmit a context release message to a subset of the target relays in the set of target relays including target relays other than the target relay to which the UE 115 performed the CHO procedure.

Figure 2:
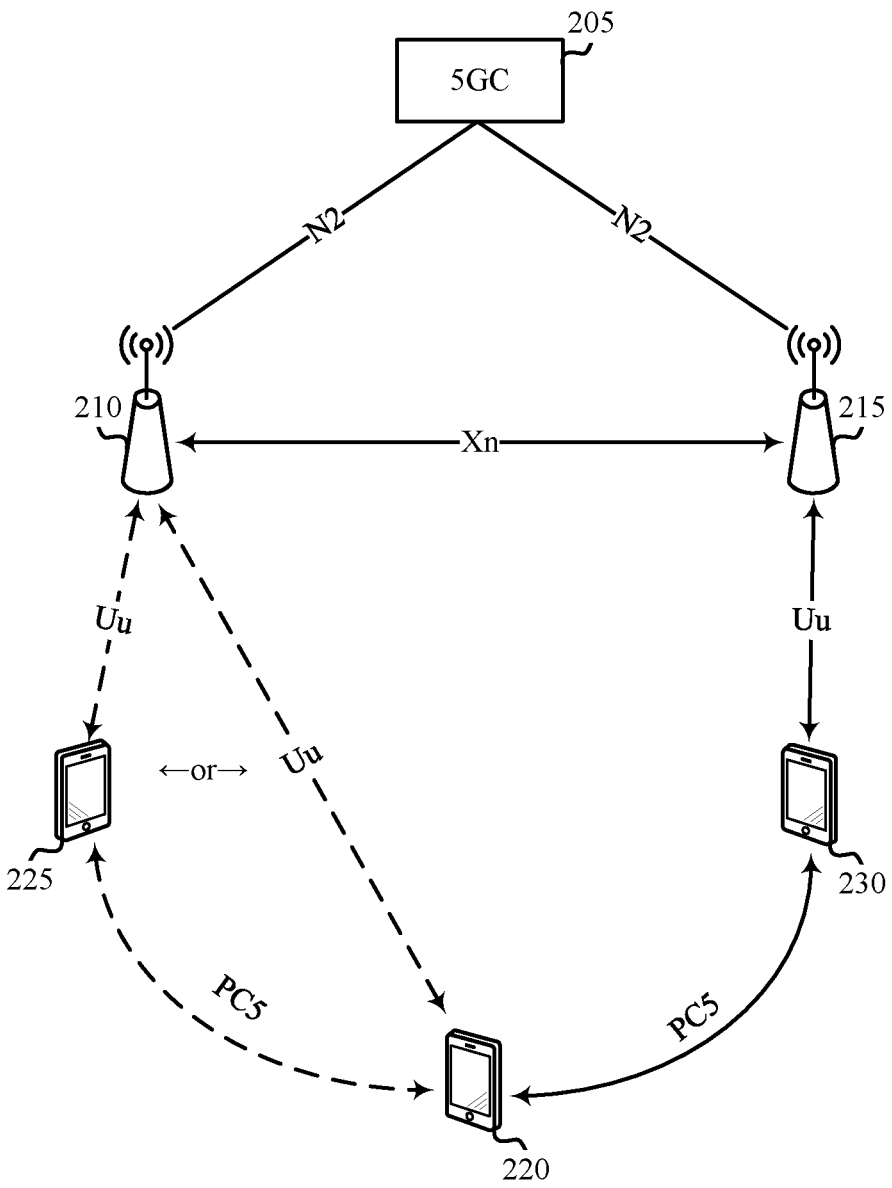
FIG. 2 illustrates an example of a wireless communication system that supports conditional handover between direct and sidelink path switch in accordance with aspects of the present disclosure.

FIG. 2 illustrates an example of a wireless communication system 200 that supports CHO between direct and sidelink path switch in accordance with aspects of the present disclosure. Wireless communication system 200 may implement aspects of wireless communication system 100. Wireless communication system 200 may include a 5GC 205 (e.g., a core network), base station 210 and base station 215 (e.g., base station(s) and/or cells associated with the same or different base station), UE 220, UE 225, and UE 230, which may be examples of the corresponding devices described herein.

UE 220 may establish a connection with 5GC 205 via a direct link to base station 210 via a Uu interface (e.g., a direct cellular link between UE 220 and base station 210). UE 220 may establish a connection with 5GC 205 via a relay UE, such as via a sidelink/PC5 interface between UE 220 and UE 225 where UE 225 relays UE 220 communications to base station 210 via a Uu interface. That is, the Uu path may include the remote UE (e.g., UE 220) connected to a gNB (e.g., base station 210) directly over the Uu interface. The PC5 path may include the remote UE (e.g., UE 220) connected to the gNB (e.g., base station 210) via a UE-to-network relay UE (e.g., UE 225) over the PC5 interface. In some examples, the remote UE (e.g., UE 220) and the relay UE (e.g., UE 225 in this example) may be operating in a RRC connected mode while performing mobility and handover functions.

Baseline handover procedures of a PC5-to-Uu scenario may support sidelink relays. Generally, such techniques may not support a CHO procedure for sidelink relays as generally one target cell/base station is prepared for the handover. In a dual active protocol stack (DAPS) scenario of the baseline handover procedures, the remote UE generally stops the Uu operations upon receipt of the handover command (e.g., drop the Uu link).

A CHO in a Uu scenario (e.g., the UE being handed over from one base station/cell to another base station/cell) may generally be based on an RRC reconfiguration (e.g., RRCReconfiguration) message that includes the candidate cell configuration and the CHO conditions. This may include execution conditions, such as handover events A3, A5, etc. In some examples, the RRC container (e.g., the RRC reconfiguration message) may be used to carry target cell configuration. The source cell (e.g., the current serving base station/cell) may not alter any contents of the configuration information from the target cell. Multiple CHO candidate cells (e.g., up to 8) may be configured. In some examples, a delta configuration with respect to the source cell may be allowed. The source base station/cell may coordinate with the target base station/cell when the source base station/cell or the target base station/cell changes and updates the UE. The UE may check the validity of the source base station/cell configuration upon reception of the CHO execution condition configuration, and then may send an RRC reconfiguration complete message as confirmation. The UE may then check the validity of target base station/cell configuration upon execution of the condition. However, such techniques generally may not provide a mechanism that support a conditional path switch (e.g., CHO) to a PC5/Uu path.

For example, aspects of the techniques described herein provide for a procedure for a conditional path switch from a Uu interface to a PC5/Uu interface. This may include introducing cell and relay group specific CHO execution conditions. This may include a configurable group priority being included in or otherwise considered for the CHO execution. When more than one cell/relay in different candidate groups satisfy a CHO execution condition, the remote UE may execute the CHO in the cell/relay with the highest group priority. The cells/relays within the same group may be regarded as having the same priority level, e.g., it may be up to remote UE which cell/relay to pick if more than one satisfies the CHO condition.

In some aspects, the CHO execution condition may be based on a procedure of a conditional path switch from a PC5 interface to a PC5 or Uu interface. This may include cell and relay group specific CHO execution conditions being introduced. Some aspects of the CHO execution condition may address failure handling when relay(s) are configured as CHO candidates, when a PC5 radio link failure (RLF) is detected and the selected relay is a CHO candidate, when the remote UE may attempt to complete CHO to this relay, and the like.

For example, a serving base station (e.g., base station 210 in this example) may identify or otherwise determine candidate handover groups for UE 220 (e.g., the remote UE in this example) for a CHO procedure. This may include one or more candidate cell groups and/or one or more candidate relay groups, where each group is associated with a different priority level. For example, a first candidate group (relay or cell) may be associated with a first priority level that is a higher priority level than a second priority level associated with a second candidate group (relay or cell). In a non-limiting example illustrated in FIG. 2, this may include UE 230 being in a candidate relay group, UE 225 being in the same or a different candidate relay group, and/or base station 215 being in a candidate cell group. Other candidate group configurations may also be included.

The serving base station (e.g., base station 210 in this example) may transmit or otherwise provide (e.g., directly and/or via a relay UE) a signal identifying or otherwise indicating respective execution conditions for the CHO procedure. That is, the signal (e.g., RRC signal) may identify one or more execution conditions that UE 220 may apply to cell(s)/relay UE(s) within each candidate group when determining whether to perform the CHO procedure.

As one example where the remote UE (e.g., UE 220 in this example) is connected to a base station (e.g., base station 210 in this example) and is performing the CHO procedure to a relay UE (e.g., UE 230 in this example), a new execution condition may include a new event X1 based on the sidelink discovery reference signal receive power (SD-RSRP) of a candidate relay (e.g., UE 230) satisfying (e.g., exceeds, or meets or exceeds) a threshold (Th1). Another example in this scenario may include a new event X2 based on a serving cell measurement failing to satisfy a threshold (e.g., being less than Th2) and the candidate relay (e.g., SD-RSRP) measurement satisfying a threshold (e.g., exceeding, or meeting or exceeding Th3).

As yet another example where the remote UE (e.g., UE 220 in this example) is connected to a relay UE (e.g., UE 225 in this example) and is performing the CHO procedure to a relay UE (e.g., UE 230 in this example) or to a base station (e.g., base station 215), a new execution condition may include a new event Y1 based on the SD-RSRP of the serving relay (e.g., UE 225) failing to satisfy a threshold (e.g., being less than Th1). Anther example in this scenario may include a new event Y2 based on the serving relay (e.g., UE 225) measurement failing to satisfy a threshold (e.g., being less than Th2) and the candidate cell (e.g., base station 215) satisfying a threshold (e.g., being greater than Th3). Yet another example in this scenario may include a new event Y3 based on the serving relay measurement failing to satisfy a threshold (e.g., less than Th4) and the candidate relay satisfying a threshold (e.g., being greater than Th5).

The UE (e.g., UE 220 in this example) may receive the signal identifying or otherwise indicating the candidate handover groups, and the respective execution conditions, and may select a handover candidate for the CHO procedure. For example, the UE may monitor one or more candidate cell(s)/relay(s) from the candidate groups to determine whether or not an execution condition has been satisfied (e.g., one or more threshold has or has not been satisfied). Based on the execution condition occurring, the UE may select the handover candidate satisfying a threshold (e.g., a cell/relay having a reference signal receive power (RSRP)/SD-RSRP, respectively, satisfying a threshold). The UE may initiate or otherwise perform the CHO to the handover candidate based on the execution condition occurring. For example, UE 220 (in this example) may perform a CHO procedure to UE 230 or base station 215 in response to the execution condition occurring from base station 210 (either directly or via UE 225).

In some aspects, the serving base station may transmit or otherwise provide information to the candidate(s) in each candidate group. For example, the serving base station may indicate an identifier of UE 220 and the identifier of the serving cell, such as when the candidate(s) are operating in an inactive or idle mode (e.g., RRC inactive or RRC idle). When the candidate(s) are operating in a connected mode (e.g., RRC connected), the information may include bearer configuration information (e.g., context information) for a relay connection for the UE with the serving cell (e.g., bearer information for a relay link between UE 220 and UE 225).

In some examples, one or more aspects of the CHO procedure may be unsuccessful. For example, before the CHO execution conditions have been met, if the reconfiguration with synchronization (with or without key change) occurs, UE 220 may release any stored CHO configurations. When a Uu/PC5 radio link failure (RLF) occurs, if the selected cell/relay afterwards is a CHO candidate, the UE 220 may perform CHO completion on this cell/relay. If not, the legacy re-establishment may be performed.

In the situation where the CHO completion fails, UE 220 may perform cell selection or relay (re)selection according to a legacy CHO procedure. If the selected cell/relay is a CHO candidate, UE 220 may attempt to complete the CHO procedure to this cell/relay. Otherwise, UE 220 may follow a legacy re-establishment procedure.

Figure 3:
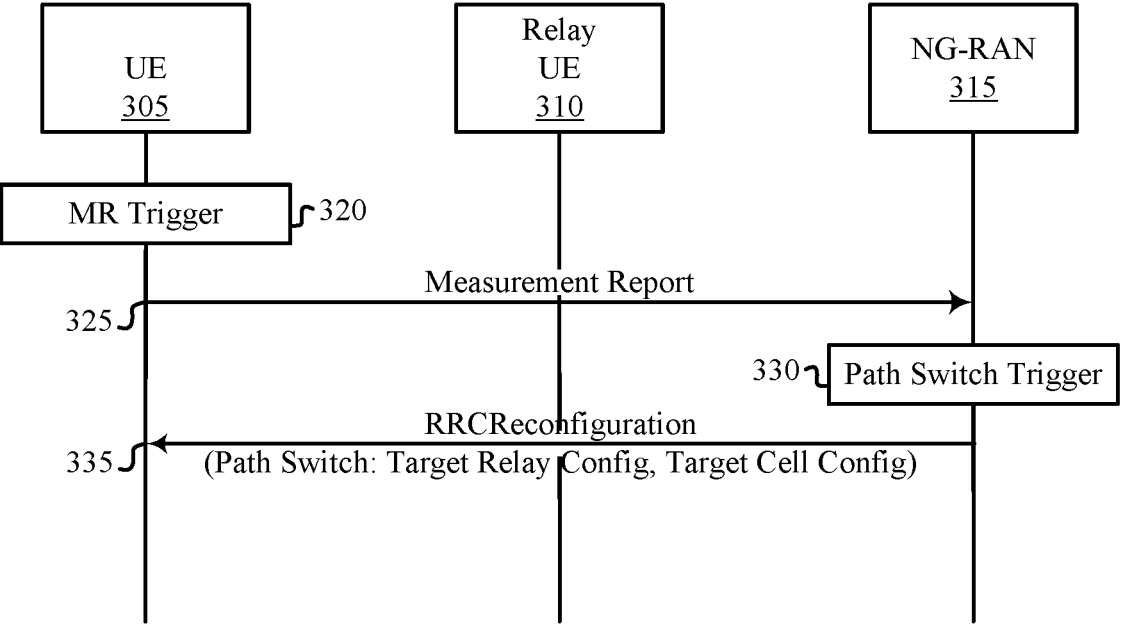
FIG. 3 illustrates an example of a process that supports conditional handover between direct and sidelink path switch in accordance with aspects of the present disclosure.

FIG. 3 illustrates an example of a process 300 that supports CHO between direct and sidelink path switch in accordance with aspects of the present disclosure. Aspects of process 300 may implement, or be implemented by or at, wireless communication systems 100 and/or 200. Aspects of process 300 may be implemented at or by UE 305, relay UE 310, and next generation-radio access network (NG-RAN) 315, which may be examples of the corresponding devices described herein. For example, NG-RAN 315 may correspond to a component within the NR RAN connecting UE 305 to 5GC, such as a base station.

At 320, UE 305 may identify or otherwise determine that a measurement report (MR) has been triggered. Broadly, the measurement report trigger may be in response to a measurement report trigger and/or may be autonomously transmitted by UE 305. For example, UE 305 may determine the measurement report trigger has occurred based on monitoring channel conditions between UE 305 and relay 310, between UE 305 and NG-RAN 315, and/or based on monitoring channel conditions for candidate(s) previously configured for UE 305.

For example, UE 305 may be configured with respective execution conditions for a CHO procedure for each of one or more candidate handover groups (e.g., candidate relay group(s) and candidate cell group(s)). Broadly, the execution conditions may be based on whether UE 305 is connected to the core network directly via a serving cell (e.g., base station) or to the serving base station via relay UE 310. This may include UE 305 monitoring signals transmitted from its serving relay and/or its serving base station, depending on the current configuration, to determine channel performance characteristics. For example, UE 305 may monitor, measure, identify, or otherwise determine RSRP, reference signal strength indicator (RSSI), channel quality information (CQI), signal-to-noise interference ratio (SNR), block level error rate (BLER), a threshold number of negative-acknowledgements (NACKs), and the like. UE 305 may determine such channel performance characteristics for one, some, or all of the relay(s) included in the candidate relay group(s), for one, some, or all of the cell(s) included in the cell relay group(s) configured for UE 305, as well as for the serving relay/cell. UE 305 may determine that the measurement report trigger has occurred based on channel performance characteristic(s) for one or more candidates and/or for the serving relay/cell satisfying the respective execution condition (e.g., X1, X2, Y1, Y2, Y3, etc., as discussed above).

Accordingly and at 325, UE 305 may transmit or otherwise provide a measurement report to NG-RAN 315. In some aspects the measurement report may carry or otherwise indicate measurement for PC5 (e.g., candidate relay(s)) and Uu (e.g., candidate cell(s)) interfaces, as well as for the serving relay/cell of UE 305. That is, when the measurement report is triggered, available PC5 and Uu measurements are reported to the NG-RAN 315, along with the serving cell and/or serving relay (when applicable) identifiers.

In response to the measurement report at 330, NG-RAN 315 may determine that a patch switch trigger has occurred. That is, NG-RAN 315 may use the measurements included in the measurement report to determine that a new path (e.g., a handover) of UE 305 may be warranted or is otherwise expected to occur within a time period. NG-RAN 315 may identify, and update as needed, the candidate relay and cell group(s) configured for UE 305 in anticipation of a path switch (e.g., handover) for UE 305. For example, NG-RAN 315 may add or remove cell(s)/relay(s) from one or more candidate relay groups and/or candidate cell groups, may change a priority level for one or more candidate groups, may move relay(s) and/or cell(s) between different candidate groups, and the like.

In response, at 335 NG-RAN 315 may transmit or otherwise provide a RRC reconfiguration message to UE 305 indicating the target relay configuration and the target cell configuration (e.g., configuring the candidate relay and the candidate cell groups for UE 305). The RRC message may be transmitted directly to UE 305 from NG-RAN 315 or may be forwarded to UE 305 via a serving relay.

For example, the RRC reconfiguration message may be sent to the remote UE (e.g., UE 305 in this example) via a relay (e.g., relay UE 310) indicating or otherwise identifying multiple candidate cell groups and candidate relay groups configured for UE 305. The CHO condition (e.g., an execution condition) can be configured on a group specific basis, e.g., each candidate group may be configured with one or more CHO execution conditions. For example, a CHO execution condition for one candidate cell group can include an execution condition including a Y2 event. One or more triggering quantities of RSRP, reference signal received quality (RSRQ), or SINR for each candidate cell group. As another example, a CHO execution condition for one candidate relay group may include an execution condition including a Y3 event. A measurement quantity may include SD-RSRP, or other channel performance characteristics.

Generally, different candidate relay/cell groups may be configured with group priority levels (e.g., each candidate group may be associated with a priority level). When more than one candidate cell/relay in different candidate groups satisfying their respective CHO execution conditions, the remote UE (e.g., UE 305) may executes the CHO procedure in the candidate cell/relay with the highest group priority level. The priority levels of different cell/relay groups may be configured based on the RRC state of the relay(s) (e.g., RRC connected or inactive/idle), or whether the cell(s)/relay(s) are being served by the same base station, and the like. How the serving base station/cell groups the candidate cell(s)/relay(s) may generally be transparent to the remote UE, in some examples. In a candidate group including both candidate relay(s) and candidate cell(s), the relay(s)/cell(s) within the candidate group may be regarded as having the same priority level as the priority level of the group.

UE 305 may use the configured candidate handover groups to perform a CHO procedure (e.g., select a candidate relay or cell to perform the CHO to). UE 305 may determine which of the relay(s) and/or cell(s) included in the candidate groups will be selected if more than one in the group satisfy the execution condition.

Figure 4:
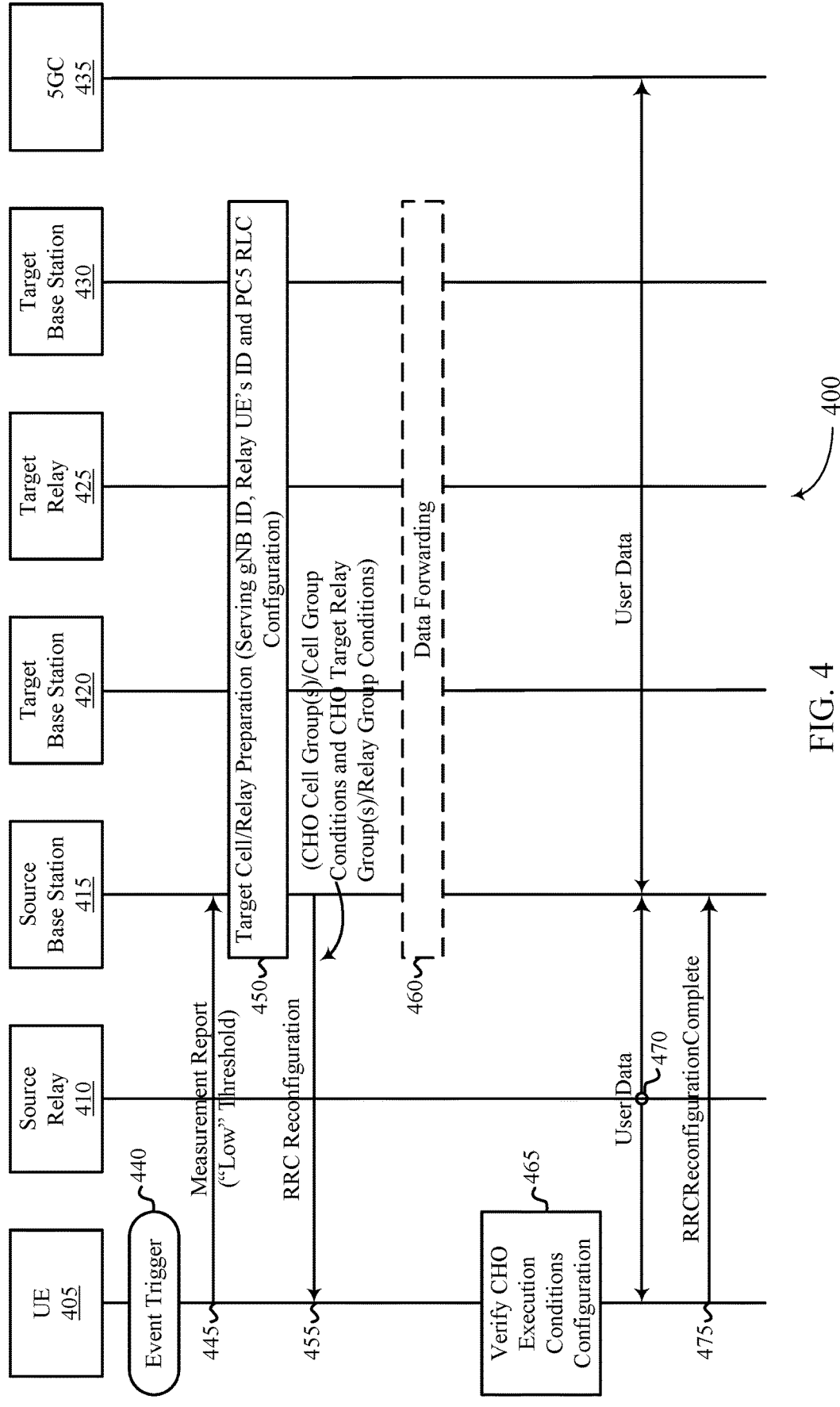
FIG. 4 illustrates an example of a process that supports conditional handover between direct and sidelink path switch in accordance with aspects of the present disclosure.

FIG. 4 illustrates an example of a process 400 that supports CHO between direct and sidelink path switch in accordance with aspects of the present disclosure. Aspects of process 400 may implement, or be implemented by or at, wireless communication systems 100 and/or 200. Aspects of process 400 may be implemented at or by UE 405, source relay 410, source base station 415, target base station 420, target relay 425, target base station 430, and 5GC 435, which may be examples of the corresponding devices described herein. For example, UE 405 may be connected to source base station 415 via source relay 410 (e.g., via a PC5 interface). Generally, process 400 illustrates an example of a candidate preparation process where the candidate relay (e.g., target relay 425) is operating in an RRC connected state.

At 440, UE 405 may determine that an event trigger has occurred. The event trigger may correspond to a measurement report trigger. The event may be triggered based on UE 405 identifying or otherwise determining that one or more channel performance characteristics for its source relay 410 fail to satisfy a threshold and/or determining that one or more channel performance characteristics for a candidate relay/cell satisfy a threshold.

In response, at 445 UE 405 may transmit or otherwise provide (and source base station 415 may receive or otherwise obtain) a measurement report. The measurement report may include PC5 measurements and Uu measurements. The measurement report may carry or otherwise convey an indication of the nature of the event trigger (e.g., an indication that its source relay connection has fallen below a threshold). The measurement report may be transmitted from UE 405 to relay UE 410, which may forward the measurement report to source base station 415.

At 450, the source base station 415 may identify or otherwise determine candidate handover group(s) for UE 405 and prepare some or all of the candidates in the candidate handover groups for a CHO procedure for UE 405. The candidate handover group(s) may be configured for a CHO procedure for UE 405 to perform a path switch (e.g., a handover) to a candidate included in a handover group. Source base station 415 may group candidate relay(s) and/or candidate cell(s) for UE 405 into individual candidate relay groups, where each candidate group is associated with a priority level. That is, each candidate handover group may be assigned or otherwise associated with a corresponding priority level. Candidate relay(s) and/or candidate cell(s) within each candidate handover group may be associated with the candidate handover group's priority level.

In some examples, source base station 415 (e.g., the serving base station of UE 405) may prepare the candidate(s) configured for UE 405. For example, source base station 415 transmit or otherwise provide information relative to the CHO to some or each candidate included in the candidate handover group(s). Generally, this may include source base station 415 providing various context/bearer information of UE 405 to some or all of the candidate(s). Examples of the information indicated during the candidate preparation may include indicating the identifier of relay UE 410, an identifier of the source base station 415, and the like. In one non-limiting example where the target relay 425 is operating in a RRC connected mode, the information may include dedicated PC5 radio link control (RLC) bearer configuration information (e.g., dedicated bearer configuration) being provided to target relay 425. Accordingly, target base station 420, target relay 425, and target base station 430 may receive or otherwise obtain context information for UE 405 in anticipation of a CHO procedure being performed. This may provide for preparation of the PC5 RLC configuration for relay UE 425 in anticipation of the CHO procedure with UE 405.

At 455, source base station 415 may transmit or otherwise provide (and UE 405 may receive or otherwise obtain) a RRC reconfiguration message. Generally, the RRC reconfiguration message may carry or otherwise convey an indication of the CHO cell group(s) (e.g., the candidate handover cell group(s)) configured for UE 405 as well as the cell group conditions (e.g., the execution condition(s) of/for each candidate handover cell group). The RRC reconfiguration message may carry or otherwise convey an indication of the CHO target relay group(s) (e.g., the candidate handover relay group(s)) as well as the relay group conditions (e.g., the execution condition(s) of/for each candidate handover relay group).

At 460, source base station 415, target base station 420, target relay 425, and target base station 430 (which may be a serving base station of target relay 425 in some example) may optionally perform data forwarding. That is, various aspects of data being communicated to and/or from UE 405 may be provided to these candidates in anticipation of the CHO procedure with UE 405 (e.g., to minimize interruptions to the data communications).

At 465, UE 405 may verify the CHO execution condition configuration. This may include UE 405 beginning to monitor for candidate(s) in the candidate relay group(s). For example, UE 405 may begin monitoring for reference signals, synchronization signals, or any other signal types being transmitted by each candidate. UE 405 may monitor such channel performance characteristics for each candidate as well as relay UE 410 and source base station 415 to determine whether one or more threshold(s) have been satisfied. UE 405 may also verify the execution conditions and/or priority level of each candidate handover group.

At 470, source relay 410 may continue to relay user date between UE 405 and source base station 415 (e.g., uplink and/or downlink communications). Source base station 415 may continue to communicate the user data of UE 405 to 5GC 435.

At 475, UE 405 may transmit or otherwise provide a RRC reconfiguration complete message to source base station 415 relayed by source relay 410. The RRC reconfiguration complete message may carry or otherwise convey an indication that UE 405 has successfully received and decoded the RRC reconfiguration message (e.g., has verified the CHO candidate relay group(s) as well as their respective execution conditions).

Figure 5:
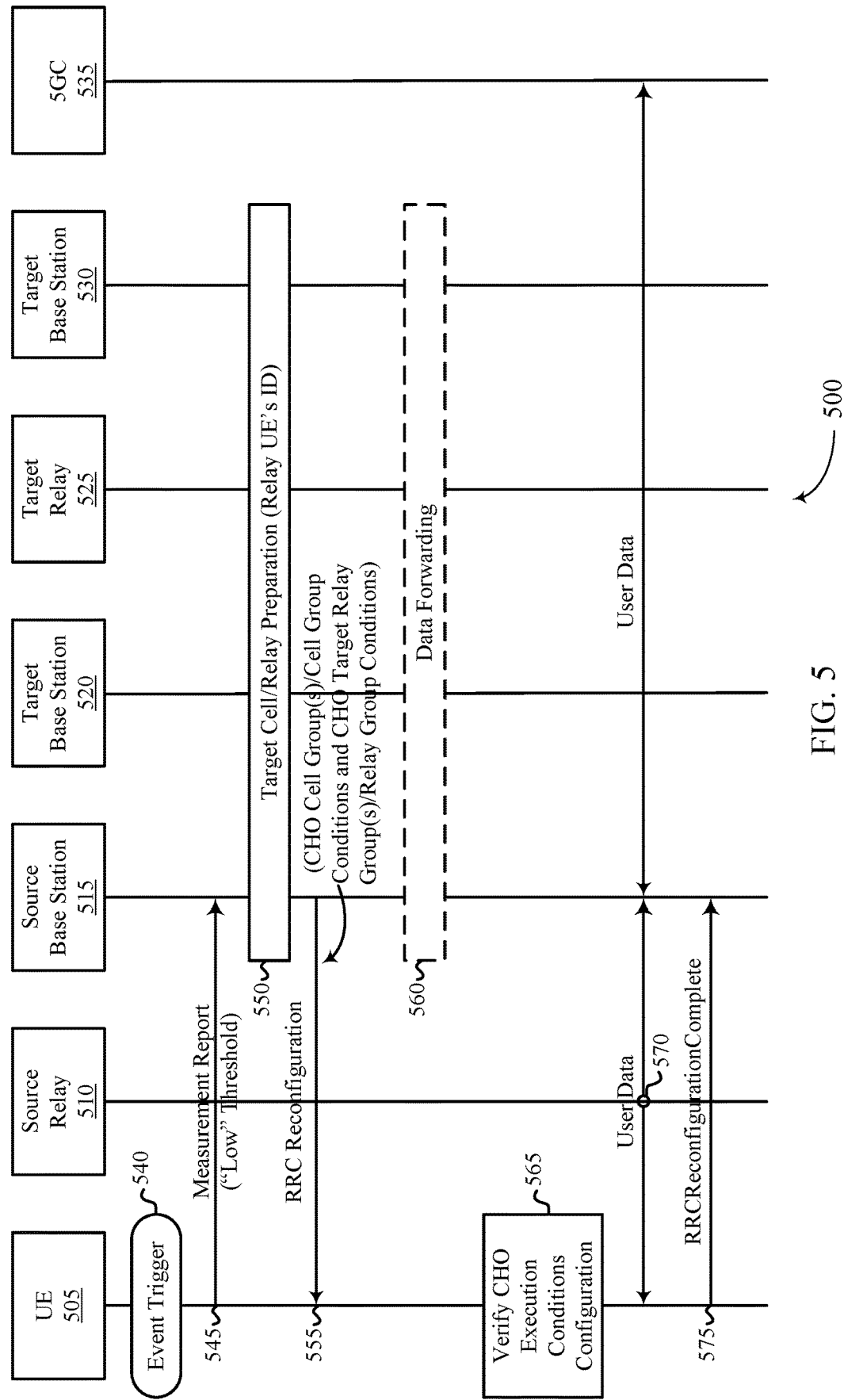
FIG. 5 illustrates an example of a process that supports conditional handover between direct and sidelink path switch in accordance with aspects of the present disclosure.

FIG. 5 illustrates an example of a process 500 that supports CHO between direct and sidelink path switch in accordance with aspects of the present disclosure. Aspects of process 500 may implement, or be implemented by or at, wireless communication systems 100 and/or 200. Aspects of process 500 may be implemented at or by UE 505, source relay 510, source base station 515, target base station 520, target relay 525, target base station 530, and 5GC 535, which may be examples of the corresponding devices described herein. For example, UE 505 may be connected to source base station 515 via source relay 510 (e.g., via a PC5 interface). Generally, process 500 illustrates an example of a candidate preparation process where the candidate relay (e.g., target relay 525) is operating in an RRC inactive or idle state.

At 540, UE 505 may determine that an event trigger has occurred. The event trigger may correspond to a measurement report trigger. The event may be triggered based on UE 505 identifying or otherwise determining that one or more channel performance characteristics for its source relay 510 fail to satisfy a threshold and/or determining that one or more channel performance characteristics for a candidate relay/cell satisfy a threshold.

In response, at 545 UE 455 may transmit or otherwise provide (and source base station 515 may receive or otherwise obtain) a measurement report. The measurement report may include PC5 measurements and Uu measurements. The measurement report may carry or otherwise convey an indication of the nature of the event trigger (e.g., an indication that its source relay connection has fallen below a threshold). The measurement report may be transmitted from UE 505 to relay UE 510, which forwards the measurement report to source base station 515.

At 550, the source base station 515 may identify or otherwise determine candidate handover group(s) for UE 505 and prepare some or all of the candidates in the candidate handover groups for a CHO procedure for UE 505. The candidate handover group(s) may be configured for a CHO procedure for UE 505 to perform a path switch (e.g., a handover) to a candidate included in a handover group. Source base station 515 may group candidate relay(s) and/or candidate cell(s) for UE 505 into individual candidate relay groups, where each candidate group is associated with a priority level. That is, each candidate handover group may be assigned or otherwise associated with a corresponding priority level. Candidate relay(s) and/or candidate cell(s) within each candidate handover group may be associated with the candidate handover group's priority level.

In some examples, source base station 515 (e.g., the serving base station of UE 505) may prepare the candidate(s) configured for UE 505. For example, source base station 515 may transmit or otherwise provide information relative to the CHO to some or each candidate included in the candidate handover group(s). Generally, this may include source base station 515 providing various context/bearer information of UE 505 to some or all of the candidate(s). Examples of the information indicated during the candidate preparation may include indicating the identifier of relay UE 510, an identifier of the source base station 515, and the like. In one non-limiting example where the target relay 525 is operating in a RRC inactive or idle mode/state, the information may omit (e.g., not include) dedicated PC5 RLC bearer configuration information (e.g., dedicated bearer configuration) being provided to target relay 525. Accordingly, target base station 520, target relay 525, and target base station 530 may receive or otherwise obtain context information for UE 505 in anticipation of a CHO procedure being performed.

At 555, source base station 515 may transmit or otherwise provide (and UE 505 may receive or otherwise obtain) a RRC reconfiguration message. Generally, the RRC reconfiguration message may carry or otherwise convey an indication of the CHO cell group(s) (e.g., the candidate handover cell group(s)) configured for UE 505 as well as the cell group conditions (e.g., the execution condition(s) of/for each candidate handover cell group). The RRC reconfiguration message may carry or otherwise convey an indication of the CHO target relay group(s) (e.g., the candidate handover relay group(s)) as well as the relay group conditions (e.g., the execution condition(s) of/for each candidate handover relay group).

At 560, source base station 515, target base station 520, target relay 525, and target base station 530 (which may be a serving base station of target relay 525 in some example) may optionally perform data forwarding. That is, various aspects of data being communicated to and/or from UE 505 may be provided to these candidates in anticipation of the CHO procedure with UE 505 (e.g., to minimize interruptions to the data communications).

At 565, UE 505 may verify the CHO execution condition configuration. This may include UE 505 beginning to monitor for candidate(s) in the candidate relay group(s). For example, UE 505 may begin monitoring for reference signals, synchronization signals, or any other signal types being transmitted by each candidate. UE 505 may monitor such channel performance characteristics for each candidate as well as relay UE 510 and source base station 515 to determine whether one or more threshold(s) have been satisfied. UE 505 may also verify the execution conditions and/or priority level of each candidate handover group.

At 570, source relay 510 may continue to relay user date between UE 505 and source base station 515 (e.g., uplink and/or downlink communications). Source base station 515 may continue to communicate the user data of UE 505 to 5GC 535.

At 575, UE 505 may transmit or otherwise provide a RRC reconfiguration complete message to source base station 515 relayed by source relay 510. The RRC reconfiguration complete message may carry or otherwise convey an indication that UE 505 has successfully received and decoded the RRC reconfiguration message (e.g., has verified the CHO candidate relay group(s) as well as their respective execution conditions).

Figure 6:
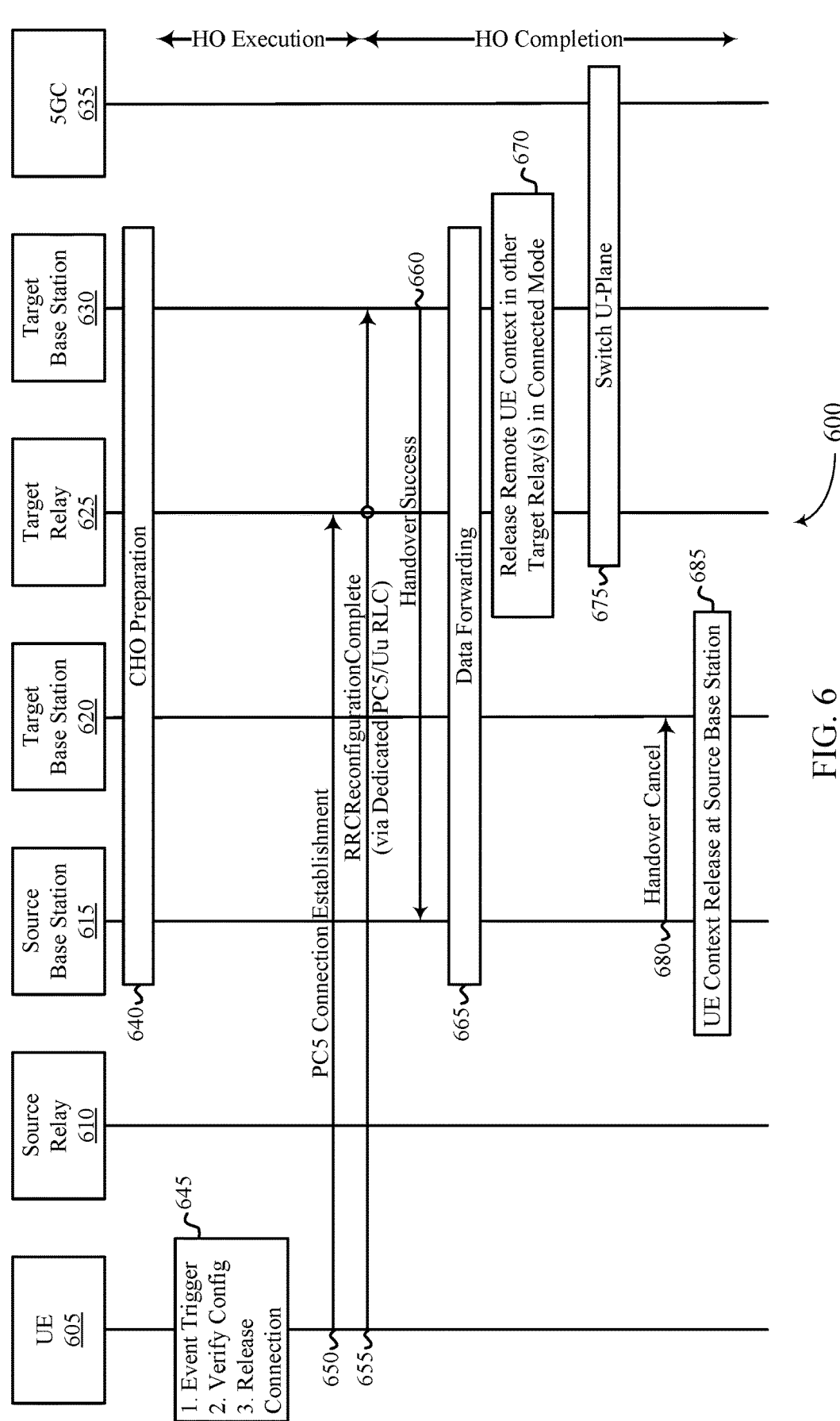
FIG. 6 illustrates an example of a process that supports conditional handover between direct and sidelink path switch in accordance with aspects of the present disclosure.

FIG. 6 illustrates an example of a process 600 that supports CHO between direct and sidelink path switch in accordance with aspects of the present disclosure. Aspects of process 600 may implement, or be implemented by or at, wireless communication systems 100 and/or 200. Aspects of process 600 may be implemented at or by UE 605, source relay 610, source base station 615, target base station 620, target relay 625, target base station 630, and 5GC 635, which may be examples of the corresponding devices described herein. For example, UE 605 may be connected to source base station 615 via source relay 610 (e.g., via a PC5 interface). Generally, process 600 illustrates an example of a conditional path switch for UE 605 from PC5 to Uu/PC5 when the CHO procedure execution and completion are performed for a relay UE operating in a connected state.

At 640, candidate cell(s)/relay(s) preparation may be performed as described with respect to process 400.

At 645, UE 605 may identify or otherwise determine that a CHO procedure is to be performed. For example, UE 605 may determine that one or more execution conditions may been met or otherwise satisfied for one or more candidates in the configured candidate handover group(s) configured for UE 605. This may include UE 605 selecting a handover candidate for performing the CHO procedure to based on the execution condition being satisfied. UE 605 may select the handover candidate from a candidate handover group based also on the priority level of the candidate handover group. In the non-limiting example illustrated in FIG. 6, UE 605 may determine that the CHO execution condition has been satisfied for target relay 625.

Based on the execution condition being satisfied and the handover candidate being selected, UE 605 may take several actions. For example, UE 605 may declare the event trigger (e.g., the execution condition being satisfied) and verify the relay configuration (e.g., the configuration of relay UE 625). In some examples, UE 605 may refrain from performing transmissions and/or monitoring for transmissions from its source cell via source relay 610 (e.g., release its connection with source base station 615). UE 605 may stop evaluating the triggering conditions of other candidate cell(s) and/or relay(s) during the CHO procedure execution, but may continue to monitor such candidates.

This may generally define the beginning of the handover execution portion of the CHO procedure of UE 605 to target relay 625.

At 650, UE 605 may transmit or otherwise provide a PC5 connection establishment message to target relay 625. The PC5 connection establishment message may carry or otherwise convey an indication that UE 605 is requesting establishment of the PC5 connection with target relay 625. UE 605 and target relay 625 may establish the PC5 connection based on the PC5 connection establishment message. As discussed above, target relay 625 may receive various context/bearer information associated with UE 605 during candidate preparation procedures discussed above.

At 655, UE 605 may transmit or otherwise provide a RRC reconfiguration complete message to target base station 630 (e.g., the serving/source base station of target relay 625). UE 605 may transmit or otherwise provide the RRC reconfiguration complete message via the selected relay (e.g., target relay 625) and using the dedicated PC5/Uu RLC channel. For example, UE 605 may transmit the RRC reconfiguration complete message to target relay 625 via the PC5 connection and target relay 625 may forward (e.g., relay) the RRC reconfiguration complete message to its serving cell (e.g., target base station 630). This may generally begin the handover complete phase of the CHO procedure.

At 660, target base station 630 may transmit or otherwise provide a handover success message to source base station 615. The handover success message may carry or otherwise convey an indication that the CHO procedure of UE 605 has been performed to target relay 625. Source base station 615 may release any context information of UE 605 and/or begin forwarding data associated with UE 605.

At 665, source base station 615, target relay 625, and target base station 630 may perform data forwarding operations for UE 605. For example, uplink data and/or downlink data associated with UE 605 may be forwarded to target base station 630 to be provided to UE 605 via target relay 625.

At 670, target base station 630 may release context/bearer information for UE 605 in other candidate relay(s) operating in an RRC connected mode. That is, target base station 630 may release this information for these devices in response to UE 605 establishing the connection with target relay 625. Accordingly, after the handover success message is transmitted to source base station 615, target base station 630 may release the remote UE's context (e.g., UE 605 context) in other candidate relays (e.g., other than target relay 625) when those candidate relays are operating in an RRC connected mode.

At 675, target relay 625, target base station 630, and 5GC 635 may switch the user plane (U-Plane) of UE 605. That is, the U-Plane of UE 605 at the protocol stack may be switched from source base station 615 to target base station 630.

At 680, source base station 615 may transmit or otherwise provide a handover cancel message to target base station 620. That is, source base station 615 may release the context information of UE 605 at target base station 620.

At 685, context information of UE 605 may be released at source base station 615. That is, source base station 615 may release any remaining context information for UE 605 in response to the CHO procedure being performed. This may define the end of the handover complete phase of the CHO procedure.

Figure 7:
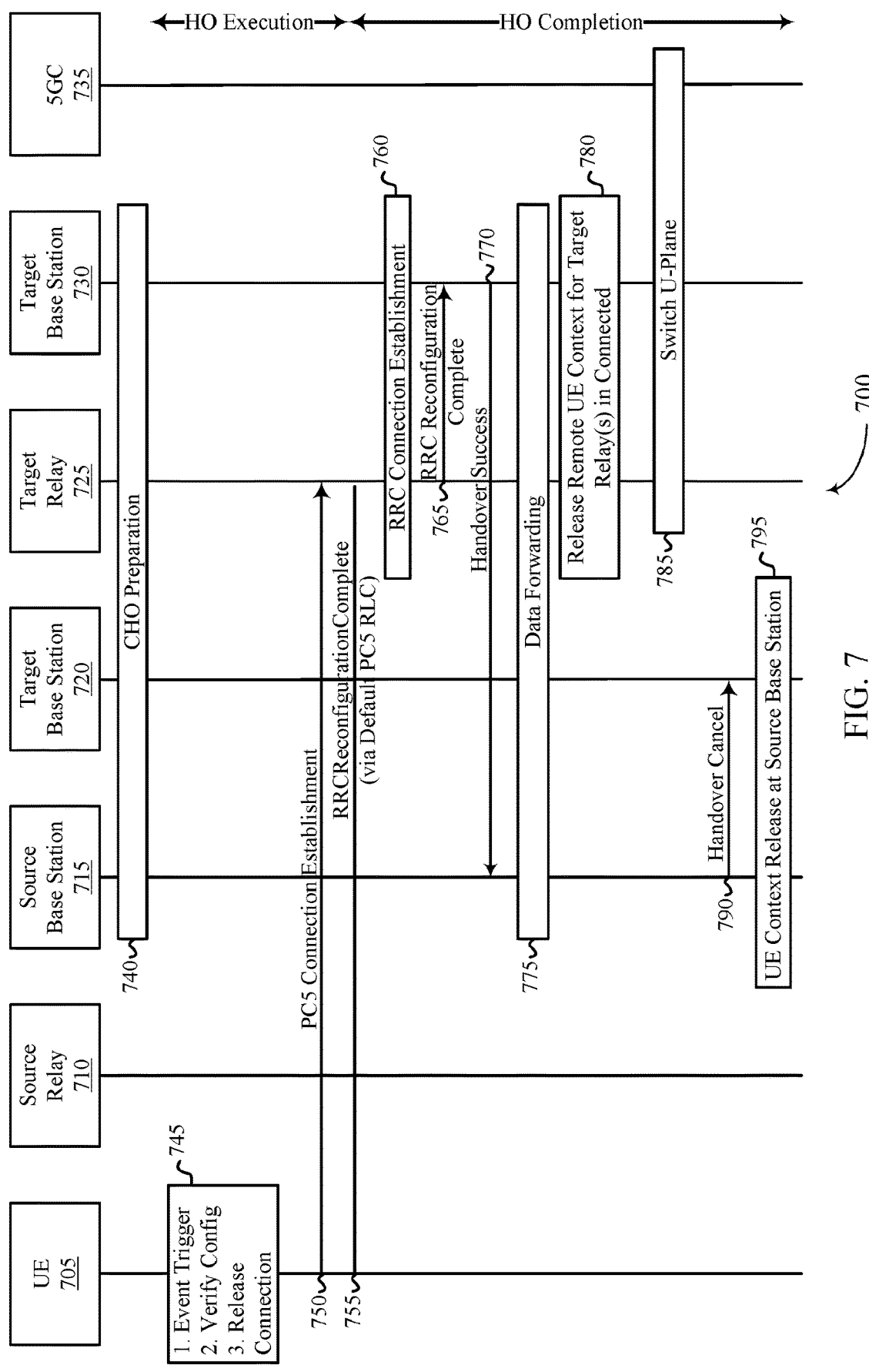
FIG. 7 illustrates an example of a process that supports conditional handover between direct and sidelink path switch in accordance with aspects of the present disclosure.

FIG. 7 illustrates an example of a process 700 that supports CHO between direct and sidelink path switch in accordance with aspects of the present disclosure. Aspects of process 700 may implement, or be implemented by or at, wireless communication systems 100 and/or 200. Aspects of process 700 may be implemented at or by UE 705, source relay 710, source base station 715, target base station 720, target relay 725, target base station 730, and 5GC 735, which may be examples of the corresponding devices described herein. For example, UE 705 may be connected to source base station 715 via source relay 710 (e.g., via a PC5 interface). Generally, process 700 illustrates an example of a conditional path switch for UE 705 from PC5 to Uu/PC5 when the CHO procedure execution and completion are performed for a relay UE operating in an inactive or idle state.

At 740, candidate cell(s)/relay(s) preparation may be performed as described with respect to process 500.

At 745, UE 705 may identify or otherwise determine that a CHO procedure is to be performed. For example, UE 705 may determine that one or more execution conditions may been met or otherwise satisfied for one or more candidates in the configured candidate handover group(s) configured for UE 705. This may include UE 705 selecting a handover candidate for performing the CHO procedure to based on the execution condition being satisfied. UE 705 may select the handover candidate from a candidate handover group based also on the priority level of the candidate handover group. In the non-limiting example illustrated in FIG. 7, UE 705 may determine that the CHO execution condition has been satisfied for target relay 725.

Based on the execution condition being satisfied and the handover candidate being selected, UE 705 may take several actions. For example, UE 705 may declare the event trigger (e.g., the execution condition being satisfied) and verify the relay configuration (e.g., the configuration of relay UE 725). In some examples, UE 705 may refrain from performing transmissions and/or monitoring for transmissions from its source cell via source relay 710 (e.g., release its connection with source base station 715). UE 705 may stop evaluating the triggering conditions of other candidate cell(s) and/or relay(s) during the CHO procedure execution, but may continue to monitor such candidates.

This may generally define the beginning of the handover execution portion of the CHO procedure of UE 705 to target relay 725.

At 750, UE 705 may transmit or otherwise provide a PC5 connection establishment message to target relay 725. The PC5 connection establishment message may carry or otherwise convey an indication that UE 705 is requesting establishment of the PC5 connection with target relay 725. UE 705 and target relay 725 may establish the PC5 connection based on the PC5 connection establishment message. As discussed above, target relay 725 may receive various context/bearer information associated with UE 705 during candidate preparation procedures discussed above.

At 755, UE 705 may transmit or otherwise provide a RRC reconfiguration complete message to target relay 725. UE 705 may transmit or otherwise provide the RRC reconfiguration complete message to the selected relay (e.g., target relay 725) using a fixed bearer. The fixed bearer may be the default PC5 RLC bearer established for PC5 communications that do not have an associated dedicated bearer. For example, UE 705 may transmit the RRC reconfiguration complete message to target relay 725 via the PC5 connection over the fixed bearer. The fixed bearer may generally be defined by common sidelink communication parameters (e.g., a sidelink context, default quality of service (QoS)), and may support sidelink paging or sidelink data communications. For example, a sidelink UE operating in a RRC inactive or idle state may periodically wake up to monitor for paging or other signals from other UEs (e.g., via SCI) and/or the serving base station. Leveraging the fixed bearer may permit the target relay 725 to receive RRC reconfiguration messaging for a CHO procedure of UE 705 while target relay 725 is operating in the inactive or idle mode. This may generally begin the handover complete phase of the CHO procedure.

At 760, target relay 725 and target base station 730 may establish an RRC connection. This may include target relay 725 establishing the RRC connection by transitioning from the RRC inactive or idle state to an RRC connected state during the RRC connection establishment procedure. The default or fixed PC5 RLC bearer may be configured to send the remote UE's (e.g., UE 605) RRC reconfiguration message.

In response, at 765 target relay 725 may transmit or otherwise provide an RRC reconfiguration complete message to target base station 730 indicating that the RRC connection has been established.

At 770, target base station 730 may transmit or otherwise provide a handover success message to source base station 715. The handover success message may carry or otherwise convey an indication that the CHO procedure of UE 705 has been performed to target relay 725. Source base station 715 may release any context information of UE 705 and/or begin forwarding data associated with UE 705.

At 775, source base station 715, target relay 725, and target base station 730 may perform data forwarding operations for UE 705. For example, uplink data and/or downlink data associated with UE 705 may be forwarded to target base station 730 to be provided to UE 705 via target relay 725.

At 780, target base station 730 may release context/bearer information for UE 705 in other candidate relay(s) operating in an RRC connected mode. That is, target base station 730 may release this information for these devices in response to UE 705 establishing the connection with target relay 725. Accordingly, after the handover success message is transmitted to source base station 715, target base station 730 may release the remote UE's context (e.g., UE 705 context) in other candidate relays (e.g., other than target relay 725) when those candidate relays are operating in an RRC connected mode.

At 785, target relay 725, target base station 730, and 5GC 735 may switch the user plane (U-Plane) of UE 705. That is, the U-Plane of UE 705 at the protocol stack may be switched from source base station 715 to target base station 730.

At 790, source base station 715 may transmit or otherwise provide a handover cancel message to target base station 720. That is, source base station 715 may release the context information of UE 705 at target base station 720.

At 795, context information of UE 705 may be released at source base station 715. That is, source base station 715 may release any remaining context information for UE 705 in response to the CHO procedure being performed. This may define the end of the handover complete phase of the CHO procedure.

Figure 8:
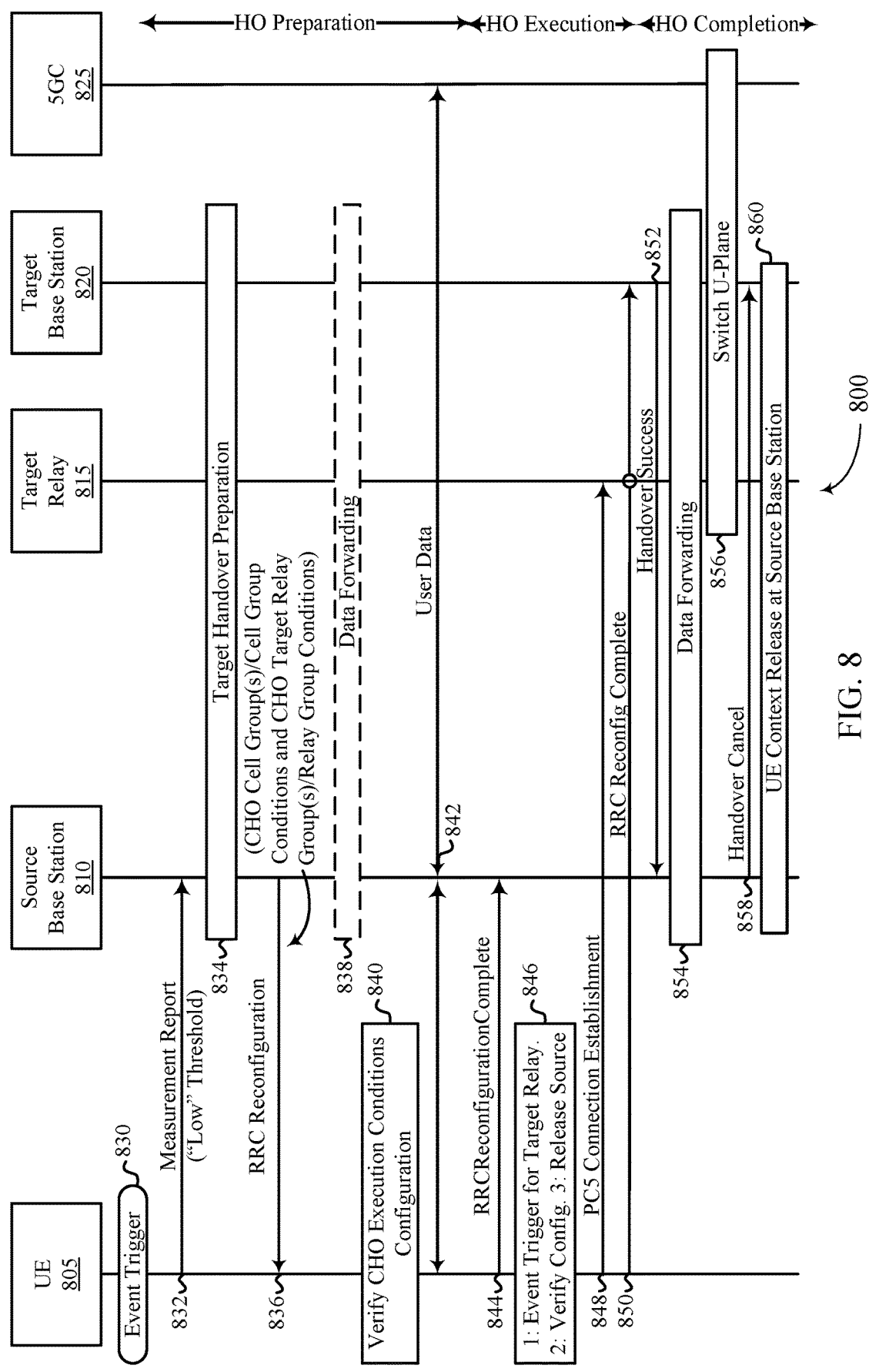
FIG. 8 illustrates an example of a process that supports conditional handover between direct and sidelink path switch in accordance with aspects of the present disclosure.

FIG. 8 illustrates an example of a process 800 that supports CHO between direct and sidelink path switch in accordance with aspects of the present disclosure. Aspects of process 800 may implement, or be implemented by or at, wireless communication systems 100 and/or 200. Aspects of process 800 may be implemented at or by UE 805, source base station 810, target relay 815, target base station 820, and 5GC 825, which may be examples of the corresponding devices described herein. Generally, process 800 illustrates an example of a conditional path switch for UE 805 from Uu to Uu/PC5 when the CHO procedure execution and completion are performed for relay UE 805.

At 830, UE 805 may determine that an event trigger has occurred. The event trigger may correspond to a measurement report trigger. The event may be triggered based on UE 805 identifying or otherwise determining that one or more channel performance characteristics for source base station 810 failing to satisfy a threshold and/or for a candidate relay/cell satisfying a threshold.

In response, at 832 UE 805 may transmit or otherwise provide (and source base station 810 may receive or otherwise obtain) a measurement report. The measurement report may include PC5 measurements and Uu measurements. The measurement report may carry or otherwise convey an indication of the nature of the event trigger (e.g., an indication that its source connection has fallen below a threshold).

At 834, the source base station 810 may identify or otherwise determine candidate handover group(s) for UE 805 and prepare some or all of the candidates in the candidate handover groups for a CHO procedure for UE 805. The candidate handover group(s) may be configured for a CHO procedure for UE 805 to perform a path switch (e.g., a handover) to a candidate included in a handover group. Source base station 810 may group candidate relay(s) and/or candidate cell(s) for UE 805 into individual candidate relay groups, where each candidate group is associated with a priority level. That is, each candidate handover group may be assigned or otherwise associated with a corresponding priority level. Candidate relay(s) and/or candidate cell(s) within each candidate handover group may be associated with the candidate handover group's priority level. In some aspects, each candidate handover group may be associated with one or more execution conditions.

In some examples, source base station 810 (e.g., the serving base station of UE 805) may prepare the candidate(s) configured for UE 805. For example, source base station 810 may transmit or otherwise provide information relative to the CHO to some or each candidate included in the candidate handover group(s). Generally, this may include source base station 810 providing various context/bearer information of UE 805 to some or all of the candidate(s). Examples of the information indicated during the candidate preparation may include indicating the identifier of UE 805, an identifier of the source base station 810, and the like. In one non-limiting example where the target relay 815 is operating in a RRC connected mode, the information may include dedicated PC5 RLC bearer configuration information (e.g., dedicated bearer configuration) being provided to target relay 825. Accordingly, target base station 820 and target relay 815 may receive or otherwise obtain context information for UE 805 in anticipation of a CHO procedure being performed. This may provide for preparation of the PC5 RLC configuration for relay UE 425 in anticipation of the CHO procedure with UE 405.

At 836, source base station 810 may transmit or otherwise provide (and UE 805 may receive or otherwise obtain) a RRC reconfiguration message. Generally, the RRC reconfiguration message may carry or otherwise convey an indication of the CHO cell group(s) (e.g., the candidate handover cell group(s)) configured for UE 805 as well as the cell group conditions (e.g., the execution condition(s) of/for each candidate handover cell group). The RRC reconfiguration message may carry or otherwise convey an indication of the CHO target relay group(s) (e.g., the candidate handover relay group(s)) as well as the relay group conditions (e.g., the execution condition(s) of/for each candidate handover relay group).

At 838, source base station 810, target relay 815, and target base station 820 (which may be a serving base station of target relay 815 in some examples) may optionally perform data forwarding. That is, various aspects of data being communicated to and/or from UE 805 may be provided to these candidates in anticipation of the CHO procedure with UE 805 (e.g., to minimize interruptions to the data communications).

At 840, UE 805 may verify the CHO execution condition configuration. This may include UE 805 beginning to monitor for candidate(s) in the candidate relay group(s). For example, UE 805 may begin monitoring for reference signals, synchronization signals, or any other signal types being transmitted by each candidate. UE 805 may monitor such channel performance characteristics for each candidate as well as source base station 810 to determine whether one or more threshold(s) have been satisfied. UE 805 may also verify the execution conditions and/or priority level of each candidate handover group.

At 842, source base station 810 may continue to communicate user data with UE 805. Source base station 810 may continue to communicate the user data of UE 805 to 5GC 825.

At 844, UE 805 may transmit or otherwise provide a RRC reconfiguration complete message to source base station 810. The RRC reconfiguration complete message may carry or otherwise convey an indication that UE 805 has successfully received and decoded the RRC reconfiguration message (e.g., has verified the CHO candidate relay group(s) as well as their respective execution conditions).

At 846, UE 805 may identify or otherwise determine that a CHO procedure is to be performed. For example, UE 805 may determine that one or more execution conditions may been met or otherwise satisfied for one or more candidates in the configured candidate handover group(s) configured for UE 805. This may include UE 805 selecting a handover candidate for performing the CHO procedure to based on the execution condition being satisfied. UE 805 may select the handover candidate from a candidate handover group based also on the priority level of the candidate handover group. In the non-limiting example illustrated in FIG. 8, UE 805 may determine that the CHO execution condition has been satisfied for target relay 815.

Based on the execution condition being satisfied and the handover candidate being selected, UE 805 may take several actions. For example, UE 705 may declare the event trigger (e.g., the execution condition being satisfied) and verify the relay configuration (e.g., the configuration of target relay 815). In some examples, UE 805 may refrain from performing transmissions and/or monitoring for transmissions from its source cell (e.g., release its connection with source base station 810). UE 805 may stop evaluating the triggering conditions of other candidate cell(s) and/or relay(s) during the CHO procedure execution, but may continue to monitor such candidates.

This may generally define the beginning of the handover execution portion of the CHO procedure of UE 805 to target relay 815.

At 848, UE 805 may transmit or otherwise provide a PC5 connection establishment message to target relay 815. The PC5 connection establishment message may carry or otherwise convey an indication that UE 805 is requesting establishment of the PC5 connection with target relay 815. UE 805 and target relay 815 may establish the PC5 connection based on the PC5 connection establishment message. As discussed above, target relay 815 may receive various context/bearer information associated with UE 805 during candidate preparation procedures discussed above.

At 850, UE 805 may transmit or otherwise provide a RRC reconfiguration complete message to target base station 820 via target relay 815. UE 805 may transmit or otherwise provide the RRC reconfiguration complete message to the selected relay (e.g., target relay 815) and using a default or a dedicated PC5/Uu RLC channel (e.g., the default or fixed bearer). For example, UE 805 may transmit the RRC reconfiguration complete message to target relay 815 via the PC5 connection. This may generally begin the handover complete phase of the CHO procedure.

At 852, target base station 820 may transmit or otherwise provide a handover success message to source base station 810. The handover success message may carry or otherwise convey an indication that the CHO procedure of UE 805 has been performed to target relay 815. Source base station 810 may release any context information of UE 805 and/or begin forwarding data associated with UE 805.

At 854, source base station 810, target relay 815, and target base station 820 may perform data forwarding operations for UE 805. For example, uplink data and/or downlink data associated with UE 805 may be forwarded to target base station 820 to be provided to UE 805 via target relay 815.

At 856, target relay 815, target base station 820, and 5GC 825 may switch the user plane (U-Plane) of UE 805. That is, the U-Plane of UE 805 at the protocol stack may be switched from source base station 810 to target base station 820.

At 858, source base station 810 may transmit or otherwise provide a handover cancel message to target base station 820. The handover cancel message may indicate that the candidate relay group(s) configured for UE 805 are released.

At 860, context information of UE 805 may be released at source base station 810. That is, source base station 810 may release any remaining context information for UE 805 in response to the CHO procedure being performed. This may define the end of the handover complete phase of the CHO procedure.

Figure 9:
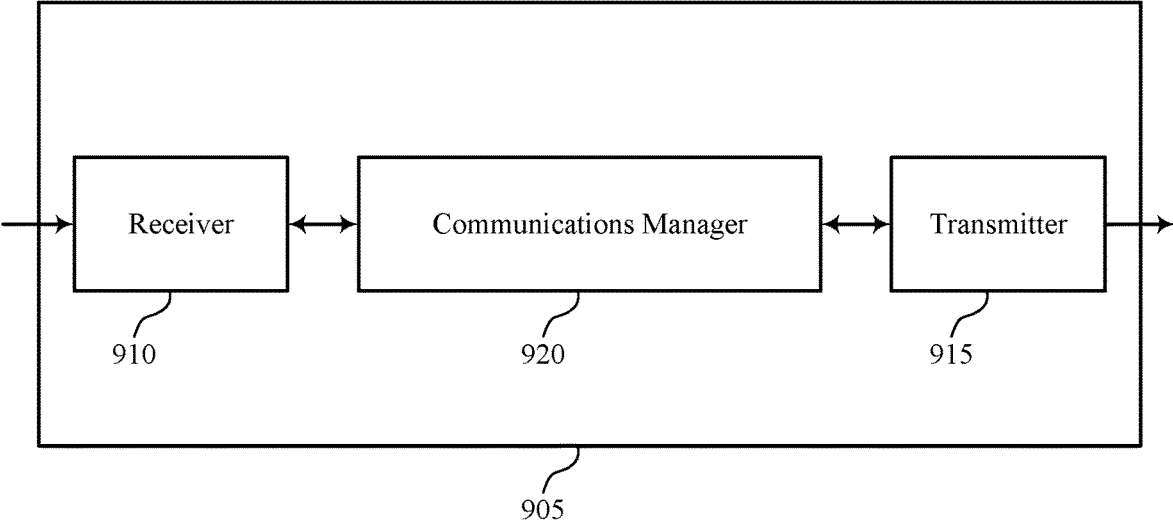
FIGS. 9 and 10 show block diagrams of devices that support conditional handover between direct and sidelink path switch in accordance with aspects of the present disclosure.

FIG. 9 shows a block diagram 900 of a device 905 that supports CHO between direct and sidelink path switch in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to CHO between direct and sidelink path switch). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to CHO between direct and sidelink path switch). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of CHO between direct and sidelink path switch as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving a signal indicating respective execution conditions for a CHO procedure for each of one or more candidate handover groups, the one or more candidate handover groups including a candidate cell group and a candidate relay group, and each candidate handover group associated with a different priority level. The communications manager 920 may be configured as or otherwise support a means for selecting a handover candidate for performing the CHO procedure based on determining that the respective execution condition is satisfied for one or more handover candidates of the one or more candidate handover groups and on the respective priority levels of the one or more candidate handover groups. The communications manager 920 may be configured as or otherwise support a means for performing the CHO procedure to the selected handover candidate.

Additionally or alternatively, the communications manager 920 may support wireless communication at a first UE in accordance with examples as disclosed herein. For example, the communications manager 920 may be configured as or otherwise support a means for receiving, from a second UE and while operating in an inactive or idle mode, a request for a sidelink connection for a CHO of the second UE. The communications manager 920 may be configured as or otherwise support a means for establishing a fixed bearer of the sidelink connection with the second UE based on the request for the sidelink connection. The communications manager 920 may be configured as or otherwise support a means for receiving, from the second UE via the fixed bearer, a connection reconfiguration complete message associated with a CHO of the second UE. The communications manager 920 may be configured as or otherwise support a means for transitioning, based on the request, from the inactive or idle mode to a connected mode. The communications manager 920 may be configured as or otherwise support a means for forwarding the connection reconfiguration complete message to a serving base station of the first UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved CHO procedures using candidate handover groups including candidate cell(s) and candidate relay(s), where the CHO procedure is based on a candidate handover group priority level and associated execution conditions for the CHO procedure.

Figure 10:
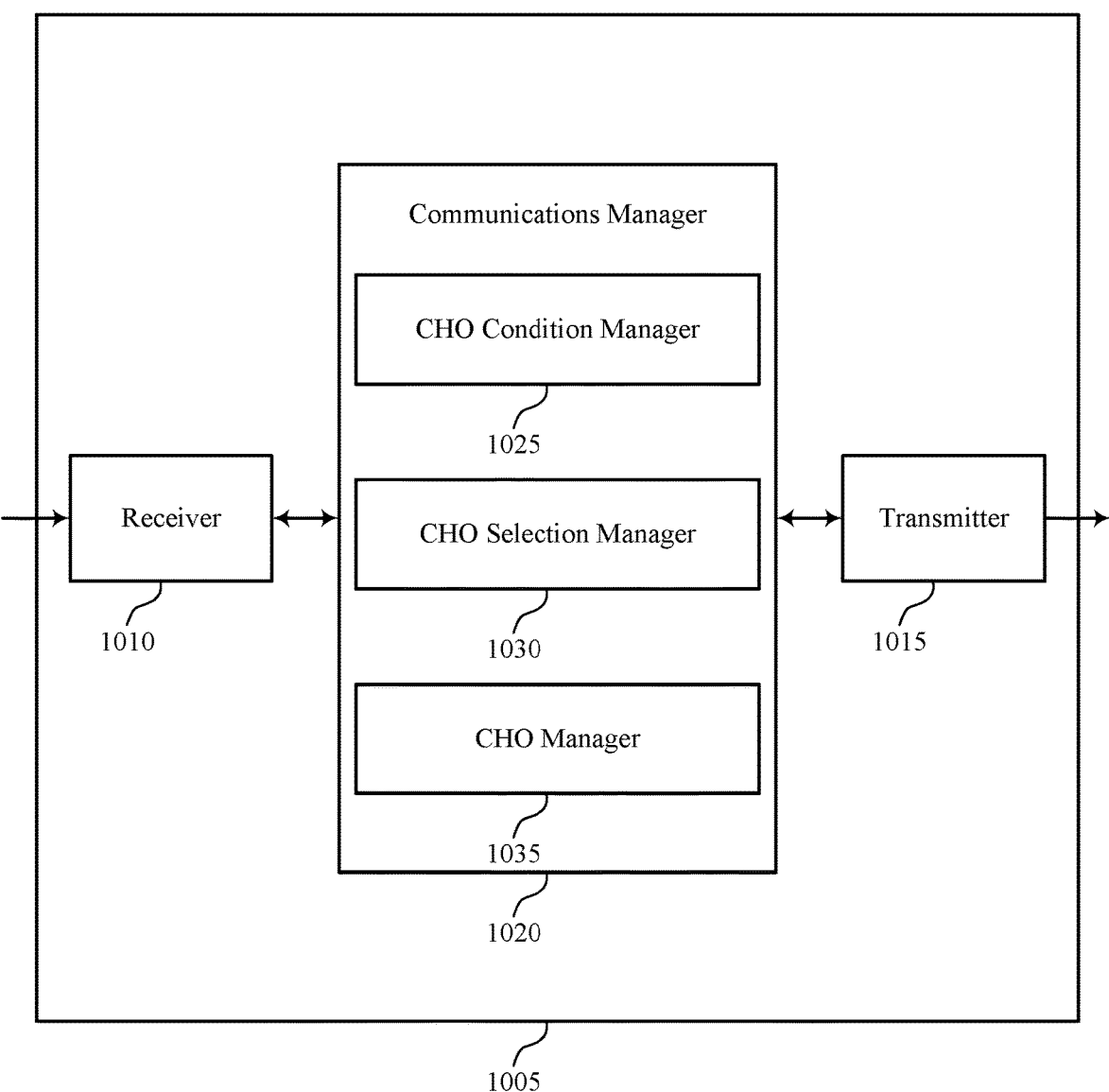

FIG. 10 shows a block diagram 1000 of a device 1005 that supports CHO between direct and sidelink path switch in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to CHO between direct and sidelink path switch). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to CHO between direct and sidelink path switch). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of CHO between direct and sidelink path switch as described herein. For example, the communications manager 1020 may include a CHO condition manager 1025, a CHO selection manager 1030, a CHO manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The CHO condition manager 1025 may be configured as or otherwise support a means for receiving a signal indicating respective execution conditions for a CHO procedure for each of one or more candidate handover groups, the one or more candidate handover groups including a candidate cell group and a candidate relay group, and each candidate handover group associated with a different priority level. The CHO selection manager 1030 may be configured as or otherwise support a means for selecting a handover candidate for performing the CHO procedure based on determining that the respective execution condition is satisfied for one or more handover candidates of the one or more candidate handover groups and on the respective priority levels of the one or more candidate handover groups. The CHO manager 1035 may be configured as or otherwise support a means for performing the CHO procedure to the selected handover candidate.

Additionally or alternatively, the communications manager 1020 may support wireless communication at a first UE in accordance with examples as disclosed herein. The CHO selection manager 1030 may be configured as or otherwise support a means for receiving, from a second UE and while operating in an inactive or idle mode, a request for a sidelink connection for a CHO of the second UE. The CHO manager 1035 may be configured as or otherwise support a means for establishing a fixed bearer of the sidelink connection with the second UE based on the request for the sidelink connection. The CHO manager 1035 may be configured as or otherwise support a means for receiving, from the second UE via the fixed bearer, a connection reconfiguration complete message associated with a CHO of the second UE. The CHO manager 1035 may be configured as or otherwise support a means for transitioning, based on the request, from the inactive or idle mode to a connected mode. The CHO manager 1035 may be configured as or otherwise support a means for forwarding the connection reconfiguration complete message to a serving base station of the first UE.

Figure 11:
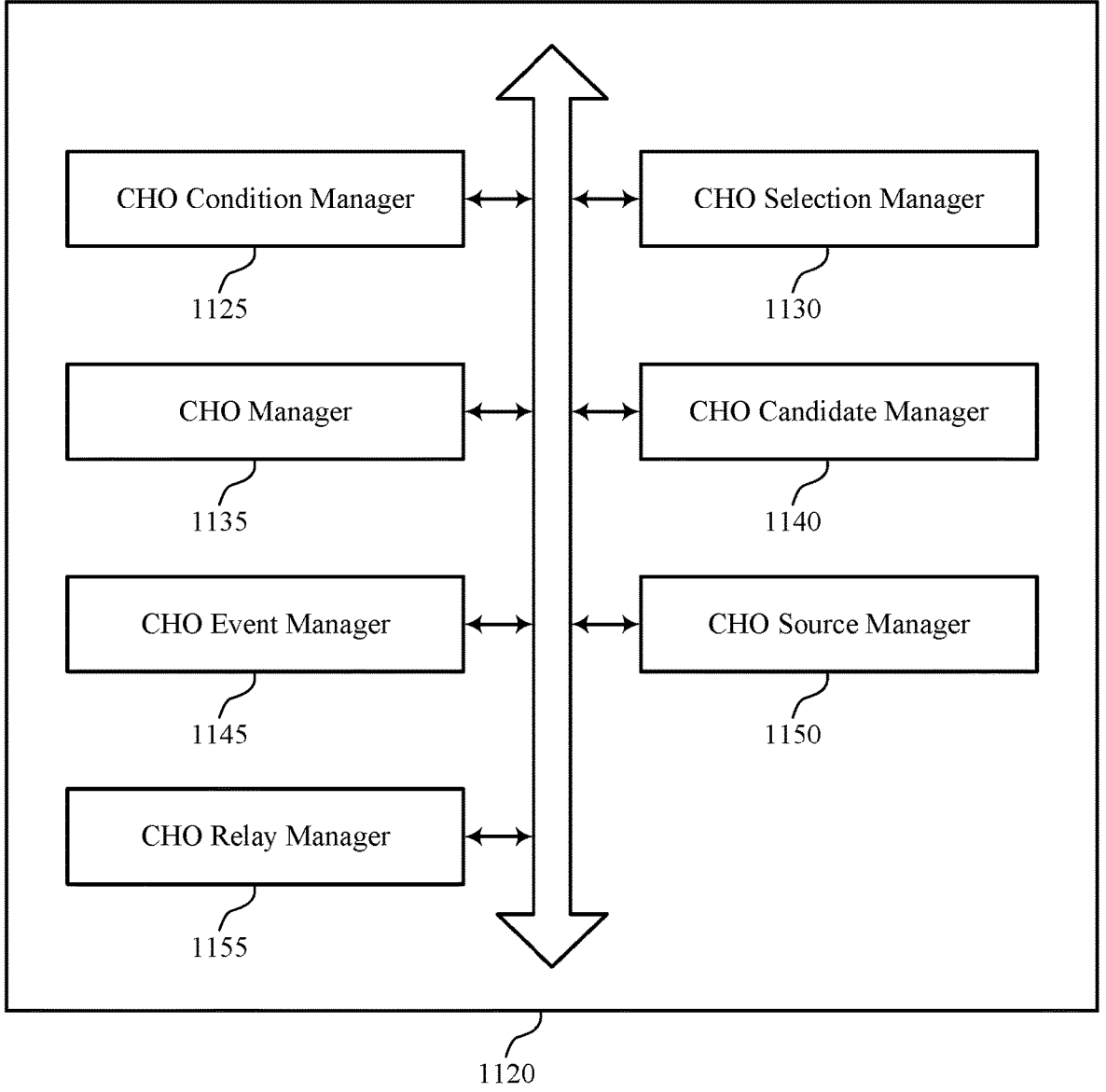
FIG. 11 shows a block diagram of a communications manager that supports conditional handover between direct and sidelink path switch in accordance with aspects of the present disclosure.

FIG. 11 shows a block diagram 1100 of a communications manager 1120 that supports CHO between direct and sidelink path switch in accordance with aspects of the present disclosure. The communications manager 1120 may be an example of aspects of a communications manager 920, a communications manager 1020, or both, as described herein. The communications manager 1120, or various components thereof, may be an example of means for performing various aspects of CHO between direct and sidelink path switch as described herein. For example, the communications manager 1120 may include a CHO condition manager 1125, a CHO selection manager 1130, a CHO manager 1135, a CHO candidate manager 1140, a CHO event manager 1145, a CHO source manager 1150, a CHO relay manager 1155, or any combination thereof. Each of these components may communicate, directly or indirectly, with one another (e.g., via one or more buses).

The communications manager 1120 may support wireless communication at a UE in accordance with examples as disclosed herein. The CHO condition manager 1125 may be configured as or otherwise support a means for receiving a signal indicating respective execution conditions for a CHO procedure for each of one or more candidate handover groups, the one or more candidate handover groups including a candidate cell group and a candidate relay group, and each candidate handover group associated with a different priority level. The CHO selection manager 1130 may be configured as or otherwise support a means for selecting a handover candidate for performing the CHO procedure based on determining that the respective execution condition is satisfied for one or more handover candidates of the one or more candidate handover groups and on the respective priority levels of the one or more candidate handover groups. The CHO manager 1135 may be configured as or otherwise support a means for performing the CHO procedure to the selected handover candidate.

In some examples, the CHO candidate manager 1140 may be configured as or otherwise support a means for receiving a radio resource control message forwarded by a serving relay, the radio resource control message including an indication of the one or more candidate handover groups. In some examples, the CHO candidate manager 1140 may be configured as or otherwise support a means for identifying, based on the indication, a first execution condition of the respective execution conditions for the candidate cell group and a second execution condition of the respective execution conditions for the candidate relay group, where the first execution condition is associated with a first measurement event and the second execution condition is associated with a second, different measurement event. In some examples, the CHO candidate manager 1140 may be configured as or otherwise support a means for identifying, based on the indication, a first priority level for the candidate cell group and a second priority level for the candidate relay group.

In some examples, the CHO event manager 1145 may be configured as or otherwise support a means for identifying, based on monitoring a signal from one or more handover candidates in the one or more candidate handover groups, a receive power level for each of the one or more handover candidates. In some examples, the CHO event manager 1145 may be configured as or otherwise support a means for determining that the respective execution condition is satisfied based on the receive power level of the one or more handover candidates satisfying a threshold.

In some examples, the CHO event manager 1145 may be configured as or otherwise support a means for determining, based on monitoring for a sidelink discovery reference signal, that the receive power level for one or more relays of the candidate relay group satisfy the threshold, where the CHO is performed based on the receive power level for the one or more relays satisfying the threshold.

In some examples, the CHO event manager 1145 may be configured as or otherwise support a means for determining that the receive power level for a serving cell fails to satisfy a serving cell threshold, where the CHO is performed based on the receive power level for the one or more relays satisfying the threshold and the receive power for the serving cell failing to satisfy the serving cell threshold.

In some examples, the CHO event manager 1145 may be configured as or otherwise support a means for determining, based on monitoring for a sidelink discovery reference signal, that the receive power level for a serving relay fails to satisfy a serving relay threshold, where the CHO is performed based on the receive power level for the serving relay failing to satisfying the serving relay threshold.

In some examples, the CHO event manager 1145 may be configured as or otherwise support a means for determining, based on monitoring for a reference signal, that the receive power level for one or more handover candidates satisfy a threshold, where the CHO is performed based on the receive power level for the serving relay failing to satisfy the serving relay threshold and the receive power for the one or more handover candidates satisfying the threshold.

In some examples, the CHO event manager 1145 may be configured as or otherwise support a means for determining, based on monitoring for a sidelink reference signal, that the receive power level for a serving relay fails to satisfy a serving relay threshold. In some examples, the CHO event manager 1145 may be configured as or otherwise support a means for determining, based on monitoring for a sidelink discovery reference signal, that the receive power level for a candidate relay of the candidate relay group satisfies a threshold, where the CHO is performed based on the receive power level for the serving relay failing to satisfy the serving relay threshold and the receive power level for the candidate relay satisfying the threshold.

In some examples, the CHO source manager 1150 may be configured as or otherwise support a means for refraining, based on the respective execution condition being satisfied, from performing transmissions to a source cell via a serving relay. In some examples, the CHO source manager 1150 may be configured as or otherwise support a means for transmitting, to a target cell associated with a selected candidate relay, a handover complete message based on the CHO procedure being performed.

In some examples, the handover complete message is transmitted to the target cell via the selected candidate relay while the selected candidate relay is operating in a connected mode. In some examples, the handover complete message is transmitted over a dedicated sidelink bearer from the source cell. In some examples, the handover complete message is transmitted to the selected candidate relay for relaying to the target cell while the selected candidate relay is operating in an idle mode or an inactive mode. In some examples, the handover complete message is transmitted over a fixed sidelink bearer.

Additionally or alternatively, the communications manager 1120 may support wireless communication at a first UE in accordance with examples as disclosed herein. In some examples, the CHO selection manager 1130 may be configured as or otherwise support a means for receiving, from a second UE and while operating in an inactive or idle mode, a request for a sidelink connection for a CHO of the second UE. In some examples, the CHO manager 1135 may be configured as or otherwise support a means for establishing a fixed bearer of the sidelink connection with the second UE based on the request for the sidelink connection. In some examples, the CHO manager 1135 may be configured as or otherwise support a means for receiving, from the second UE via the fixed bearer, a connection reconfiguration complete message associated with a CHO of the second UE. In some examples, the CHO manager 1135 may be configured as or otherwise support a means for transitioning, based on the request, from the inactive or idle mode to a connected mode. In some examples, the CHO manager 1135 may be configured as or otherwise support a means for forwarding the connection reconfiguration complete message to a serving base station of the first UE.

In some examples, the CHO relay manager 1155 may be configured as or otherwise support a means for relaying, based on the CHO of the second UE, data between the second UE and the serving base station of the first UE.

Figure 12:
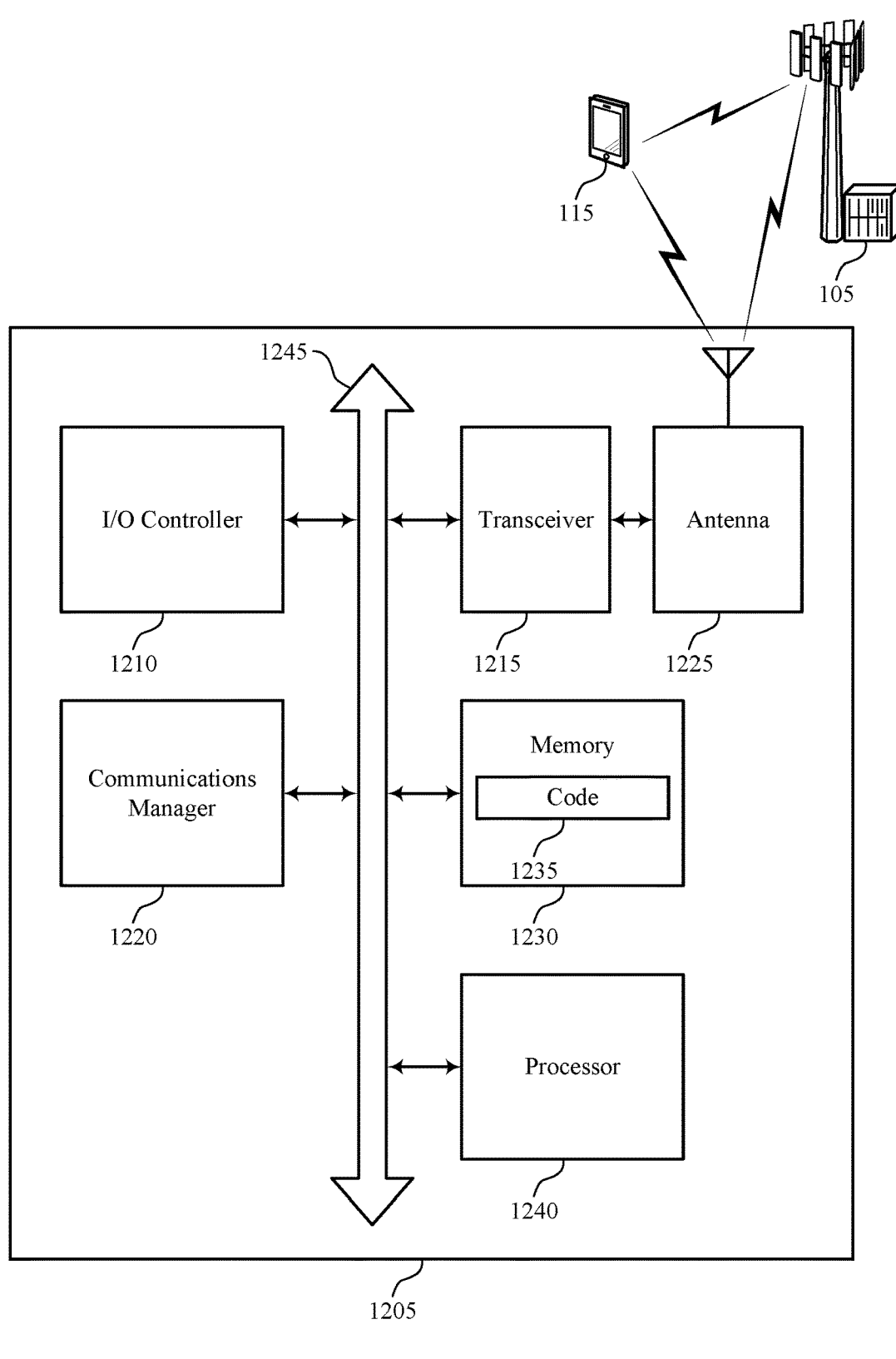
FIG. 12 shows a diagram of a system including a device that supports conditional handover between direct and sidelink path switch in accordance with aspects of the present disclosure.

FIG. 12 shows a diagram of a system 1200 including a device 1205 that supports CHO between direct and sidelink path switch in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting CHO between direct and sidelink path switch). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving a signal indicating respective execution conditions for a CHO procedure for each of one or more candidate handover groups, the one or more candidate handover groups including a candidate cell group and a candidate relay group, and each candidate handover group associated with a different priority level. The communications manager 1220 may be configured as or otherwise support a means for selecting a handover candidate for performing the CHO procedure based on determining that the respective execution condition is satisfied for one or more handover candidates of the one or more candidate handover groups and on the respective priority levels of the one or more candidate handover groups. The communications manager 1220 may be configured as or otherwise support a means for performing the CHO procedure to the selected handover candidate.

Additionally or alternatively, the communications manager 1220 may support wireless communication at a first UE in accordance with examples as disclosed herein. For example, the communications manager 1220 may be configured as or otherwise support a means for receiving, from a second UE and while operating in an inactive or idle mode, a request for a sidelink connection for a CHO of the second UE. The communications manager 1220 may be configured as or otherwise support a means for establishing a fixed bearer of the sidelink connection with the second UE based on the request for the sidelink connection. The communications manager 1220 may be configured as or otherwise support a means for receiving, from the second UE via the fixed bearer, a connection reconfiguration complete message associated with a CHO of the second UE. The communications manager 1220 may be configured as or otherwise support a means for transitioning, based on the request, from the inactive or idle mode to a connected mode. The communications manager 1220 may be configured as or otherwise support a means for forwarding the connection reconfiguration complete message to a serving base station of the first UE.

By including or configuring the communications manager 1220 in accordance with examples as described herein, the device 1205 may support techniques for improved CHO procedures using candidate handover groups including candidate cell(s) and candidate relay(s), where the CHO procedure is based on a candidate handover group priority level and associated execution conditions for the CHO procedure.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of CHO between direct and sidelink path switch as described herein, or the processor 1240 and the memory 1230 may be otherwise configured to perform or support such operations.

Figure 13:
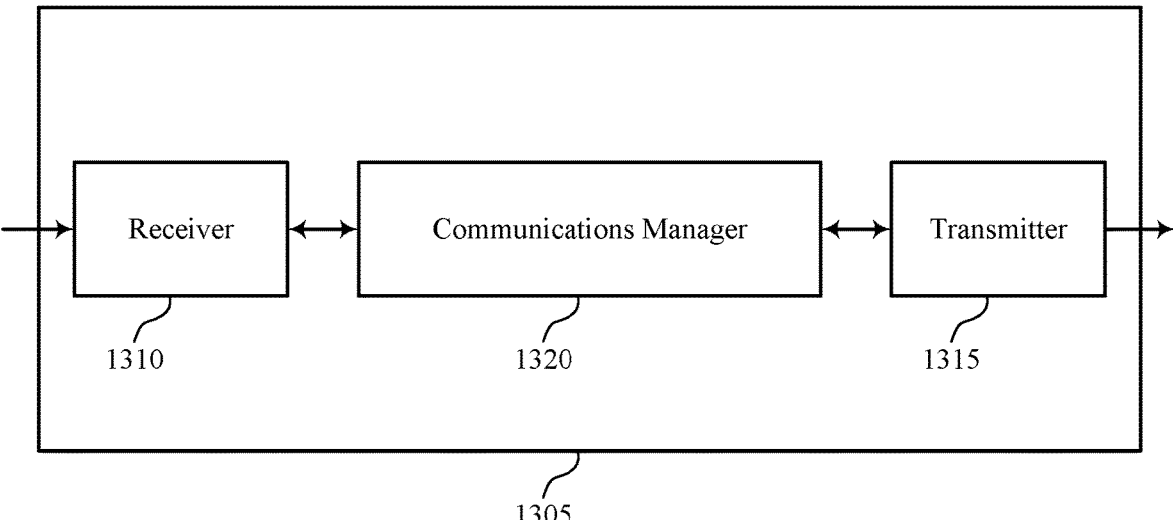
FIGS. 13 and 14 show block diagrams of devices that support conditional handover between direct and sidelink path switch in accordance with aspects of the present disclosure.

FIG. 13 shows a block diagram 1300 of a device 1305 that supports CHO between direct and sidelink path switch in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to CHO between direct and sidelink path switch). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to CHO between direct and sidelink path switch). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of CHO between direct and sidelink path switch as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a serving base station in accordance with examples as disclosed herein. For example, the communications manager 1320 may be configured as or otherwise support a means for identifying, for a UE, one or more candidate handover groups for the UE for performing a CHO procedure, the one or more candidate handover groups including a candidate cell group and a candidate relay group, and each candidate handover group associated with a different priority level. The communications manager 1320 may be configured as or otherwise support a means for transmitting, to the UE, a signal indicating respective execution conditions for the CHO procedure for each of the one or more candidate handover groups.

Additionally or alternatively, the communications manager 1320 may support wireless communication at a target base station in accordance with examples as disclosed herein. For example, the communications manager 1320 may be configured as or otherwise support a means for receiving, for a UE, respective context information associated with a CHO procedure of the UE to a set of target relays being served by the target base station, where the context information includes information used to establish a respective dedicated bearers between the UE and the target base station via each target relay in the set of target relays. The communications manager 1320 may be configured as or otherwise support a means for transmitting the respective context information for the UE to each target relay in the set of target relays to support establishment of the respective dedicated bearers. The communications manager 1320 may be configured as or otherwise support a means for receiving an indication of the CHO procedure of the UE to a target relay of the set of target relays. The communications manager 1320 may be configured as or otherwise support a means for transmitting a context release message to a subset of the target relays in the set of target relays including target relays other than the target relay to which the UE performed the CHO procedure.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for improved CHO procedures using candidate handover groups including candidate cell(s) and candidate relay(s), where the CHO procedure is based on a candidate handover group priority level and associated execution conditions for the CHO procedure.

Figure 14:
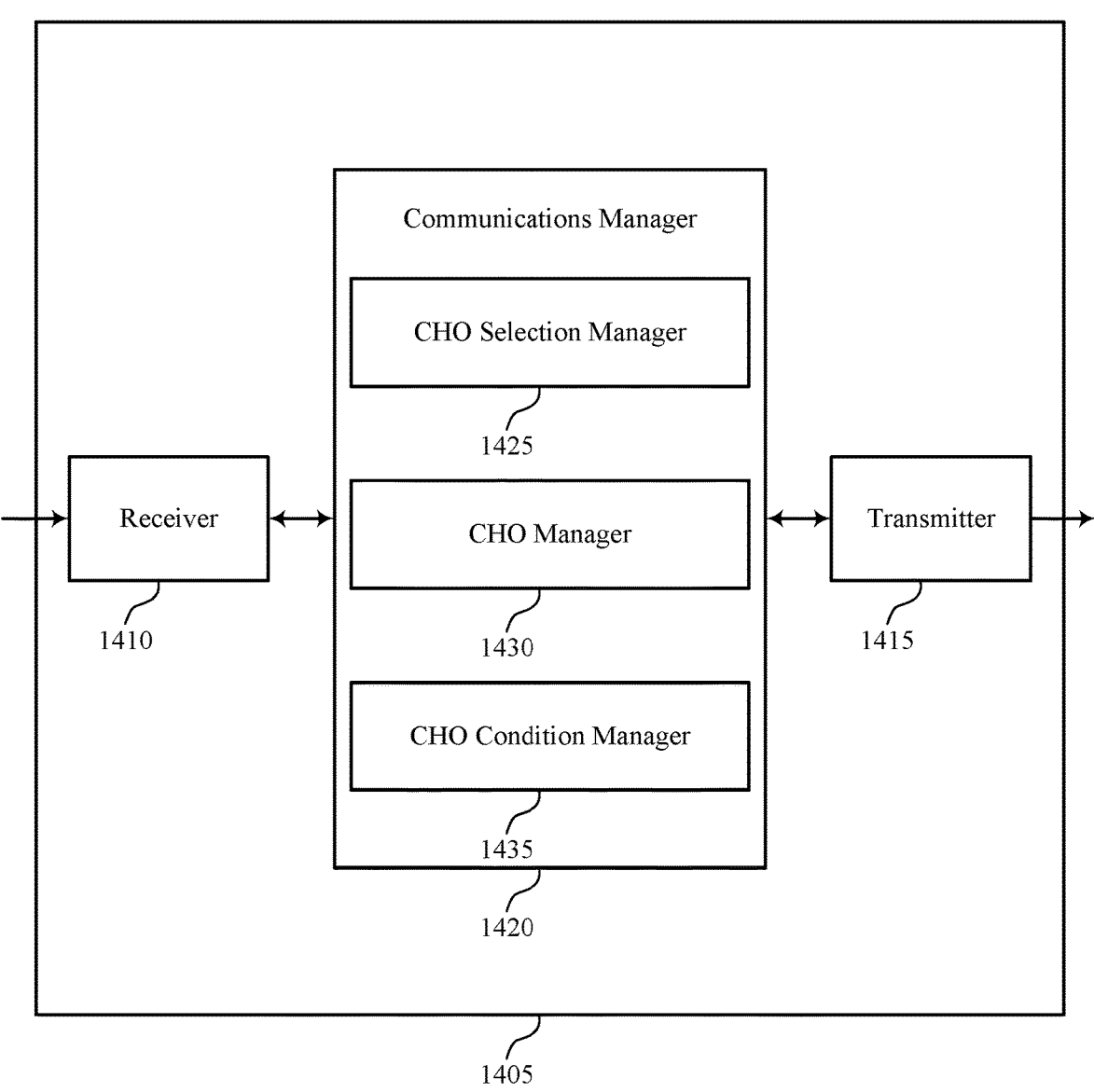

FIG. 14 shows a block diagram 1400 of a device 1405 that supports CHO between direct and sidelink path switch in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to CHO between direct and sidelink path switch). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to CHO between direct and sidelink path switch). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of CHO between direct and sidelink path switch as described herein. For example, the communications manager 1420 may include a CHO selection manager 1425, a CHO manager 1430, a CHO condition manager 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a serving base station in accordance with examples as disclosed herein. The CHO selection manager 1425 may be configured as or otherwise support a means for identifying, for a UE, one or more candidate handover groups for the UE for performing a CHO procedure, the one or more candidate handover groups including a candidate cell group and a candidate relay group, and each candidate handover group associated with a different priority level. The CHO manager 1430 may be configured as or otherwise support a means for transmitting, to the UE, a signal indicating respective execution conditions for the CHO procedure for each of the one or more candidate handover groups.

Additionally or alternatively, the communications manager 1420 may support wireless communication at a target base station in accordance with examples as disclosed herein. The CHO manager 1430 may be configured as or otherwise support a means for receiving, for a UE, respective context information associated with a CHO procedure of the UE to a set of target relays being served by the target base station, where the context information includes information used to establish a respective dedicated bearers between the UE and the target base station via each target relay in the set of target relays. The CHO manager 1430 may be configured as or otherwise support a means for transmitting the respective context information for the UE to each target relay in the set of target relays to support establishment of the respective dedicated bearers. The CHO condition manager 1435 may be configured as or otherwise support a means for receiving an indication of the CHO procedure of the UE to a target relay of the set of target relays. The CHO condition manager 1435 may be configured as or otherwise support a means for transmitting a context release message to a subset of the target relays in the set of target relays including target relays other than the target relay to which the UE performed the CHO procedure.

Figure 15:
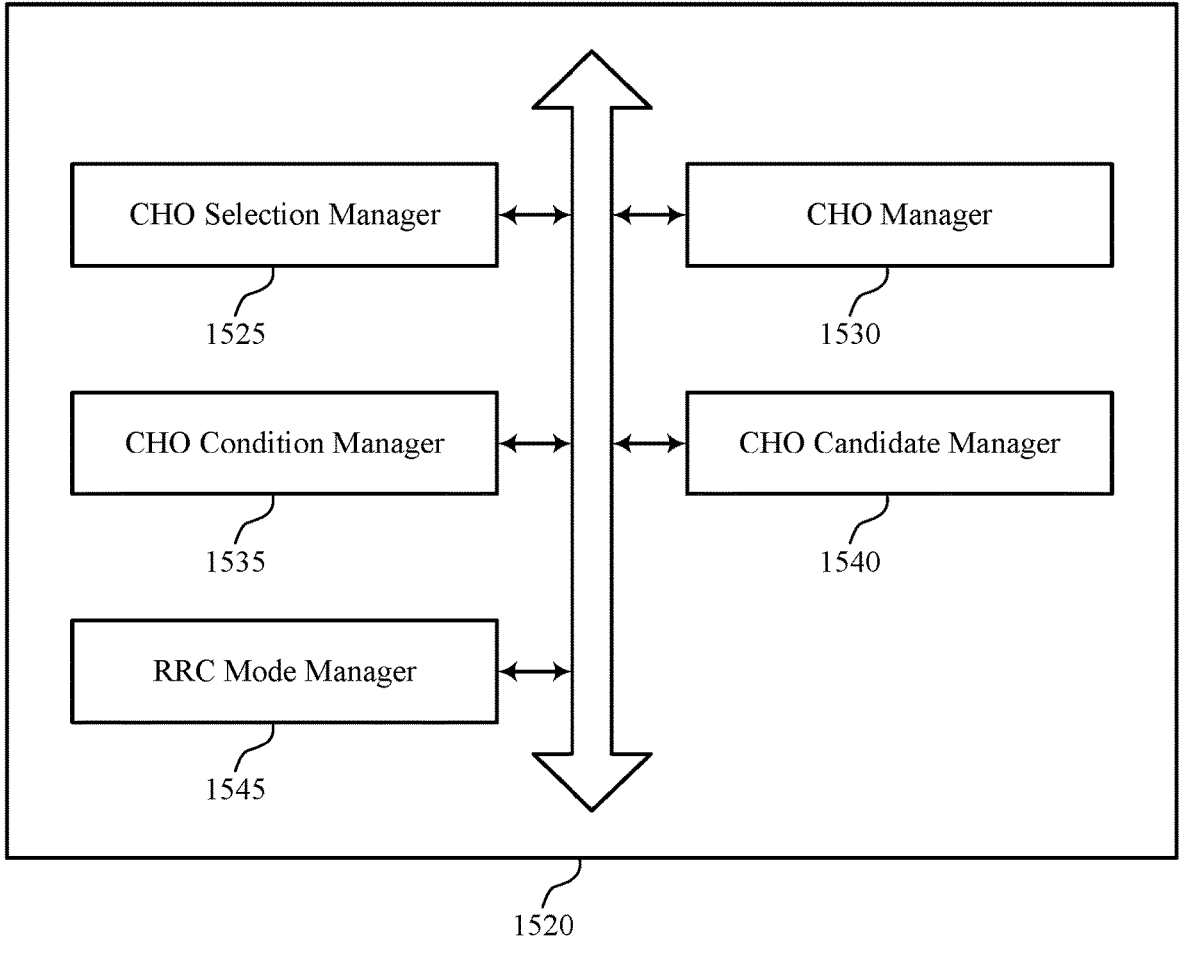
FIG. 15 shows a block diagram of a communications manager that supports conditional handover between direct and sidelink path switch in accordance with aspects of the present disclosure.

FIG. 15 shows a block diagram 1500 of a communications manager 1520 that supports CHO between direct and sidelink path switch in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of CHO between direct and sidelink path switch as described herein. For example, the communications manager 1520 may include a CHO selection manager 1525, a CHO manager 1530, a CHO condition manager 1535, a CHO candidate manager 1540, an RRC mode manager 1545, or any combination thereof. Each of these components may communicate, directly or indirectly, with one another (e.g., via one or more buses).

The communications manager 1520 may support wireless communication at a serving base station in accordance with examples as disclosed herein. The CHO selection manager 1525 may be configured as or otherwise support a means for identifying, for a UE, one or more candidate handover groups for the UE for performing a CHO procedure, the one or more candidate handover groups including a candidate cell group and a candidate relay group, and each candidate handover group associated with a different priority level. The CHO manager 1530 may be configured as or otherwise support a means for transmitting, to the UE, a signal indicating respective execution conditions for the CHO procedure for each of the one or more candidate handover groups.

In some examples, the candidate relay group includes one or more candidate relays, and the CHO candidate manager 1540 may be configured as or otherwise support a means for sending, to a serving base station of the one or more candidate relays for forwarding to the one or more candidate relays and based on the one or more candidate relays operating in a connected mode, an identifier of the UE, an identifier of a serving cell, and a dedicated bearer configuration for a relay connection for the UE with the serving cell.

In some examples, the candidate relay group includes one or more candidate relays, and the CHO candidate manager 1540 may be configured as or otherwise support a means for transmitting, to a serving base station of the one or more candidate relays and based on the one or more candidate relays operating in an inactive mode or an idle mode, an identifier of the UE and an identifier of a serving cell.

Additionally or alternatively, the communications manager 1520 may support wireless communication at a target base station in accordance with examples as disclosed herein. In some examples, the CHO manager 1530 may be configured as or otherwise support a means for receiving, for a UE, respective context information associated with a CHO procedure of the UE to a set of target relays being served by the target base station, where the context information includes information used to establish a respective dedicated bearers between the UE and the target base station via each target relay in the set of target relays. In some examples, the CHO manager 1530 may be configured as or otherwise support a means for transmitting the respective context information for the UE to each target relay in the set of target relays to support establishment of the respective dedicated bearers. The CHO condition manager 1535 may be configured as or otherwise support a means for receiving an indication of the CHO procedure of the UE to a target relay of the set of target relays. In some examples, the CHO condition manager 1535 may be configured as or otherwise support a means for transmitting a context release message to a subset of the target relays in the set of target relays including target relays other than the target relay to which the UE performed the CHO procedure.

In some examples, the RRC mode manager 1545 may be configured as or otherwise support a means for determining that a first target relay in the subset of the target relays is operating in a connected mode, where the context release message is transmitted based on the first target relay operating in the connected mode.

In some examples, the RRC mode manager 1545 may be configured as or otherwise support a means for determining that a first target relay in the subset of the target relays is operating in a connected mode, where the context release message is transmitted based on the first target relay operating in the connected mode.

In some examples, the RRC mode manager 1545 may be configured as or otherwise support a means for determining that the target relay is operating in an inactive or idle mode. In some examples, the RRC mode manager 1545 may be configured as or otherwise support a means for receiving a connection reconfiguration complete message from the target relay via a fixed bearer between the target base station and target relay, where the connection reconfiguration complete message is received via the fixed bearer based on the target relay operating in the inactive or idle mode.

Figure 16:
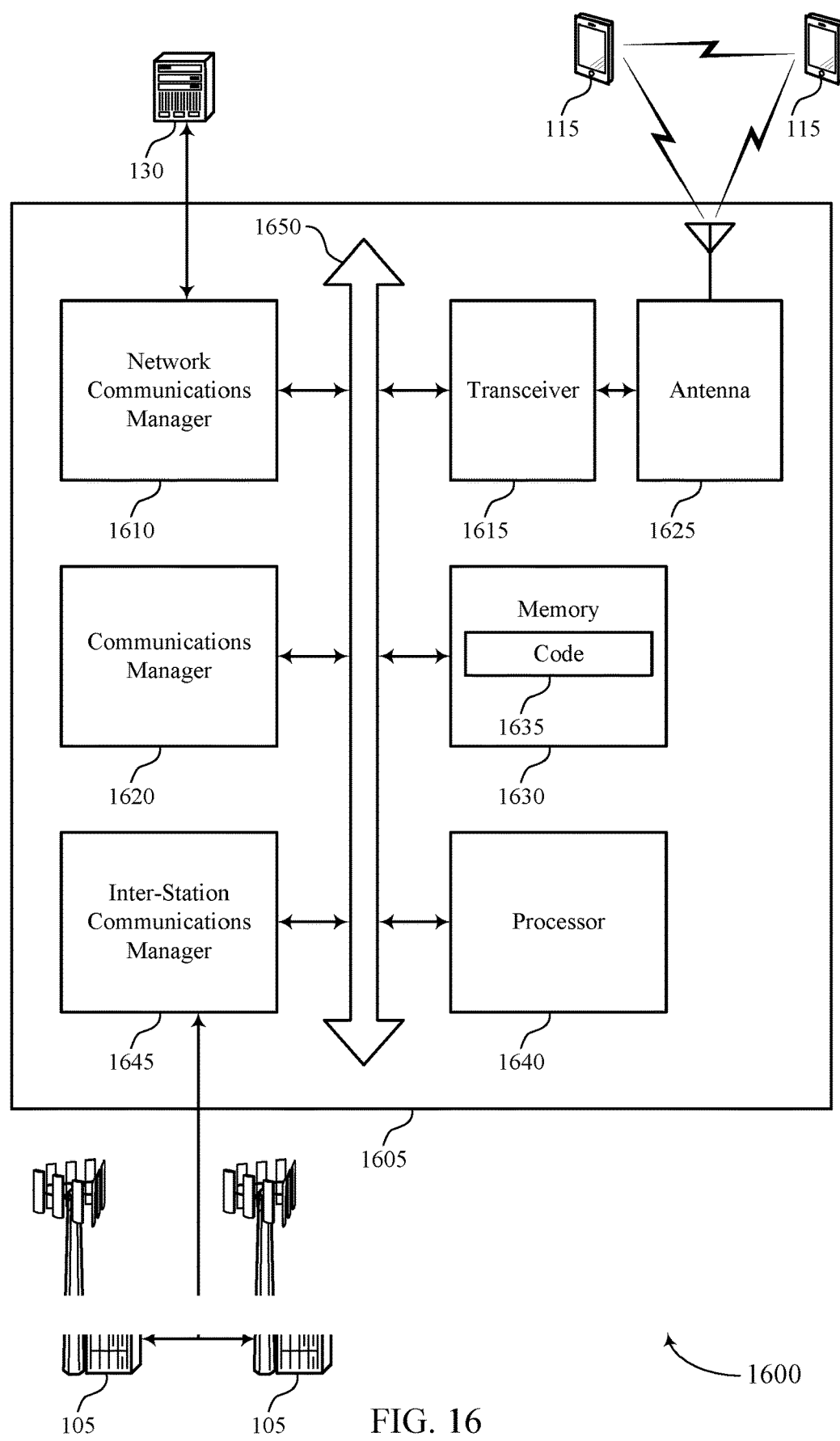
FIG. 16 shows a diagram of a system including a device that supports conditional handover between direct and sidelink path switch in accordance with aspects of the present disclosure.

FIG. 16 shows a diagram of a system 1600 including a device 1605 that supports CHO between direct and sidelink path switch in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting CHO between direct and sidelink path switch). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a serving base station in accordance with examples as disclosed herein. For example, the communications manager 1620 may be configured as or otherwise support a means for identifying, for a UE, one or more candidate handover groups for the UE for performing a CHO procedure, the one or more candidate handover groups including a candidate cell group and a candidate relay group, and each candidate handover group associated with a different priority level. The communications manager 1620 may be configured as or otherwise support a means for transmitting, to the UE, a signal indicating respective execution conditions for the CHO procedure for each of the one or more candidate handover groups.

Additionally or alternatively, the communications manager 1620 may support wireless communication at a target base station in accordance with examples as disclosed herein. For example, the communications manager 1620 may be configured as or otherwise support a means for receiving, for a UE, respective context information associated with a CHO procedure of the UE to a set of target relays being served by the target base station, where the context information includes information used to establish a respective dedicated bearers between the UE and the target base station via each target relay in the set of target relays. The communications manager 1620 may be configured as or otherwise support a means for transmitting the respective context information for the UE to each target relay in the set of target relays to support establishment of the respective dedicated bearers. The communications manager 1620 may be configured as or otherwise support a means for receiving an indication of the CHO procedure of the UE to a target relay of the set of target relays. The communications manager 1620 may be configured as or otherwise support a means for transmitting a context release message to a subset of the target relays in the set of target relays including target relays other than the target relay to which the UE performed the CHO procedure.

By including or configuring the communications manager 1620 in accordance with examples as described herein, the device 1605 may support techniques for improved CHO procedures using candidate handover groups including candidate cell(s) and candidate relay(s), where the CHO procedure is based on a candidate handover group priority level and associated execution conditions for the CHO procedure.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of CHO between direct and sidelink path switch as described herein, or the processor 1640 and the memory 1630 may be otherwise configured to perform or support such operations.

FIG. 17 shows a flowchart illustrating a method 1700 that supports CHO between direct and sidelink path switch in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving a signal indicating respective execution conditions for a CHO procedure for each of one or more candidate handover groups, the one or more candidate handover groups including a candidate cell group and a candidate relay group, and each candidate handover group associated with a different priority level. The operations of 1705 may be performed in accordance with examples as disclosed herein. In some examples, aspects of the operations of 1705 may be performed by a CHO condition manager 1125 as described with reference to FIG. 11.

At 1710, the method may include selecting a handover candidate for performing the CHO procedure based on determining that the respective execution condition is satisfied for one or more handover candidates of the one or more candidate handover groups and on the respective priority levels of the one or more candidate handover groups. The operations of 1710 may be performed in accordance with examples as disclosed herein. In some examples, aspects of the operations of 1710 may be performed by a CHO selection manager 1130 as described with reference to FIG. 11.

At 1715, the method may include performing the CHO procedure to the selected handover candidate. The operations of 1715 may be performed in accordance with examples as disclosed herein. In some examples, aspects of the operations of 1715 may be performed by a CHO manager 1135 as described with reference to FIG. 11.

FIG. 18 shows a flowchart illustrating a method 1800 that supports CHO between direct and sidelink path switch in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving a signal indicating respective execution conditions for a CHO procedure for each of one or more candidate handover groups, the one or more candidate handover groups including a candidate cell group and a candidate relay group, and each candidate handover group associated with a different priority level. The operations of 1805 may be performed in accordance with examples as disclosed herein. In some examples, aspects of the operations of 1805 may be performed by a CHO condition manager 1125 as described with reference to FIG. 11.

At 1810, the method may include receiving a radio resource control message forwarded by a serving relay, the radio resource control message including an indication of the one or more candidate handover groups. The operations of 1810 may be performed in accordance with examples as disclosed herein. In some examples, aspects of the operations of 1810 may be performed by a CHO candidate manager 1140 as described with reference to FIG. 11.

At 1815, the method may include selecting a handover candidate for performing the CHO procedure based on determining that the respective execution condition is satisfied for one or more handover candidates of the one or more candidate handover groups and on the respective priority levels of the one or more candidate handover groups. The operations of 1815 may be performed in accordance with examples as disclosed herein. In some examples, aspects of the operations of 1815 may be performed by a CHO selection manager 1130 as described with reference to FIG. 11.

At 1820, the method may include performing the CHO procedure to the selected handover candidate. The operations of 1820 may be performed in accordance with examples as disclosed herein. In some examples, aspects of the operations of 1820 may be performed by a CHO manager 1135 as described with reference to FIG. 11.

FIG. 19 shows a flowchart illustrating a method 1900 that supports CHO between direct and sidelink path switch in accordance with aspects of the present disclosure. The operations of the method 1900 may be implemented by a base station or its components as described herein. For example, the operations of the method 1900 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 1905, the method may include identifying, for a UE, one or more candidate handover groups for the UE for performing a CHO procedure, the one or more candidate handover groups including a candidate cell group and a candidate relay group, and each candidate handover group associated with a different priority level. The operations of 1905 may be performed in accordance with examples as disclosed herein. In some examples, aspects of the operations of 1905 may be performed by a CHO selection manager 1525 as described with reference to FIG. 15.

At 1910, the method may include transmitting, to the UE, a signal indicating respective execution conditions for the CHO procedure for each of the one or more candidate handover groups. The operations of 1910 may be performed in accordance with examples as disclosed herein. In some examples, aspects of the operations of 1910 may be performed by a CHO manager 1530 as described with reference to FIG. 15.

FIG. 20 shows a flowchart illustrating a method 2000 that supports CHO between direct and sidelink path switch in accordance with aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2005, the method may include receiving, from a second UE and while operating in an inactive or idle mode, a request for a sidelink connection for a CHO of the second UE. The operations of 2005 may be performed in accordance with examples as disclosed herein. In some examples, aspects of the operations of 2005 may be performed by a CHO selection manager 1130 as described with reference to FIG. 11.

At 2010, the method may include establishing a fixed bearer of the sidelink connection with the second UE based on the request for the sidelink connection. The operations of 2010 may be performed in accordance with examples as disclosed herein. In some examples, aspects of the operations of 2010 may be performed by a CHO manager 1135 as described with reference to FIG. 11.

At 2015, the method may include receiving, from the second UE via the fixed bearer, a connection reconfiguration complete message associated with a CHO of the second UE.

The operations of 2015 may be performed in accordance with examples as disclosed herein. In some examples, aspects of the operations of 2015 may be performed by a CHO manager 1135 as described with reference to FIG. 11.

At 2020, the method may include transitioning, based on the request, from the inactive or idle mode to a connected mode. The operations of 2020 may be performed in accordance with examples as disclosed herein. In some examples, aspects of the operations of 2020 may be performed by a CHO manager 1135 as described with reference to FIG. 11.

At 2025, the method may include forwarding the connection reconfiguration complete message to a serving base station of the first UE. The operations of 2025 may be performed in accordance with examples as disclosed herein. In some examples, aspects of the operations of 2025 may be performed by a CHO manager 1135 as described with reference to FIG. 11.

FIG. 21 shows a flowchart illustrating a method 2100 that supports CHO between direct and sidelink path switch in accordance with aspects of the present disclosure. The operations of the method 2100 may be implemented by a base station or its components as described herein. For example, the operations of the method 2100 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2105, the method may include receiving, for a UE, respective context information associated with a CHO procedure of the UE to a set of target relays being served by the target base station, where the context information includes information used to establish a respective dedicated bearers between the UE and the target base station via each target relay in the set of target relays. The operations of 2105 may be performed in accordance with examples as disclosed herein. In some examples, aspects of the operations of 2105 may be performed by a CHO manager 1530 as described with reference to FIG. 15.

At 2110, the method may include transmitting the respective context information for the UE to each target relay in the set of target relays to support establishment of the respective dedicated bearers. The operations of 2110 may be performed in accordance with examples as disclosed herein. In some examples, aspects of the operations of 2110 may be performed by a CHO manager 1530 as described with reference to FIG. 15.

At 2115, the method may include receiving an indication of the CHO procedure of the UE to a target relay of the set of target relays. The operations of 2115 may be performed in accordance with examples as disclosed herein. In some examples, aspects of the operations of 2115 may be performed by a CHO condition manager 1535 as described with reference to FIG. 15.

At 2120, the method may include transmitting a context release message to a subset of the target relays in the set of target relays including target relays other than the target relay to which the UE performed the CHO procedure. The operations of 2120 may be performed in accordance with examples as disclosed herein. In some examples, aspects of the operations of 2120 may be performed by a CHO condition manager 1535 as described with reference to FIG. 15.

The following provides an overview of aspects of the present disclosure:

Aspect 1: A method for wireless communication at a UE, comprising: receiving a signal indicating respective execution conditions for a CHO procedure for each of one or more candidate handover groups, the one or more candidate handover groups comprising a candidate cell group and a candidate relay group, and each candidate handover group associated with a different priority level; selecting a handover candidate for performing the CHO procedure based at least in part on determining that the respective execution condition is satisfied for one or more handover candidates of the one or more candidate handover groups and on the respective priority levels of the one or more candidate handover groups; and performing the CHO procedure to the selected handover candidate.

Aspect 2: The method of aspect 1, further comprising: receiving+ a RRC message forwarded by a serving relay, the RRC message comprising an indication of the one or more candidate handover groups.

Aspect 3: The method of aspect 2, further comprising: identifying, based at least in part on the indication, a first execution condition of the respective execution conditions for the candidate cell group and a second execution condition of the respective execution conditions for the candidate relay group, wherein the first execution condition is associated with a first measurement event and the second execution condition is associated with a second, different measurement event.

Aspect 4: The method of any of aspects 2 through 3, further comprising: identifying, based at least in part on the indication, a first priority level for the candidate cell group and a second priority level for the candidate relay group.

Aspect 5: The method of any of aspects 1 through 4, further comprising: identifying, based at least in part on monitoring a signal from one or more handover candidates in the one or more candidate handover groups, a receive power level for each of the one or more handover candidates; and determining that the respective execution condition is satisfied based at least in part on the receive power level of the one or more handover candidates satisfying a threshold.

Aspect 6: The method of aspect 5, further comprising: determining, based at least in part on monitoring for a sidelink discovery reference signal, that the receive power level for one or more relays of the candidate relay group satisfy the threshold, wherein the CHO is performed based at least in part on the receive power level for the one or more relays satisfying the threshold.

Aspect 7: The method of aspect 6, further comprising: determining that the receive power level for a serving cell fails to satisfy a serving cell threshold, wherein the CHO is performed based at least in part on the receive power level for the one or more relays satisfying the threshold and the receive power for the serving cell failing to satisfy the serving cell threshold.

Aspect 8: The method of any of aspects 5 through 7, further comprising: determining, based at least in part on monitoring for a sidelink discovery reference signal, that the receive power level for a serving relay fails to satisfy a serving relay threshold, wherein the CHO is performed based at least in part on the receive power level for the serving relay failing to satisfying the serving relay threshold.

Aspect 9: The method of aspect 8, further comprising: determining, based at least in part on monitoring for a reference signal, that the receive power level for one or more handover candidates satisfy a threshold, wherein the CHO is performed based at least in part on the receive power level for the serving relay failing to satisfy the serving relay threshold and the receive power for the one or more handover candidates satisfying the threshold.

Aspect 10: The method of any of aspects 5 through 9, further comprising: determining, based at least in part on monitoring for a sidelink reference signal, that the receive power level for a serving relay fails to satisfy a serving relay threshold; and determining, based at least in part on monitoring for a sidelink discovery reference signal, that the receive power level for a candidate relay of the candidate relay group satisfies a threshold, wherein the CHO is performed based at least in part on the receive power level for the serving relay failing to satisfy the serving relay threshold and the receive power level for the candidate relay satisfying the threshold.

Aspect 11: The method of any of aspects 1 through 10, further comprising: refraining, based at least in part on the respective execution condition being satisfied, from performing transmissions to a source cell via a serving relay; and transmitting, to a target cell associated with a selected candidate relay, a handover complete message based at least in part on the CHO procedure being performed.

Aspect 12: The method of aspect 11, wherein the handover complete message is transmitted to the target cell via the selected candidate relay while the selected candidate relay is operating in a connected mode, and the handover complete message is transmitted over a dedicated sidelink bearer from the source cell.

Aspect 13: The method of any of aspects 11 through 12, wherein the handover complete message is transmitted to the selected candidate relay for relaying to the target cell while the selected candidate relay is operating in an idle mode or an inactive mode, and the handover complete message is transmitted over a fixed sidelink bearer.

Aspect 14: A method for wireless communication at a serving base station, comprising: identifying, for a UE, one or more candidate handover groups for the UE for performing a CHO procedure, the one or more candidate handover groups comprising a candidate cell group and a candidate relay group, and each candidate handover group associated with a different priority level; and transmitting, to the UE, a signal indicating respective execution conditions for the CHO procedure for each of the one or more candidate handover groups.

Aspect 15: The method of aspect 14, wherein the candidate relay group comprises one or more candidate relays, the method further comprising: sending, to a serving base station of the one or more candidate relays for forwarding to the one or more candidate relays and based at least in part on the one or more candidate relays operating in a connected mode, an identifier of the UE, an identifier of a serving cell, and a dedicated bearer configuration for a relay connection for the UE with the serving cell.

Aspect 16: The method of any of aspects 14 through 15, wherein the candidate relay group comprises one or more candidate relays, the method further comprising: transmitting, to a serving base station of the one or more candidate relays and based at least in part on the one or more candidate relays operating in an inactive mode or an idle mode, an identifier of the UE and an identifier of a serving cell.

Aspect 17: A method for wireless communication at a first UE, comprising: receiving, from a second UE and while operating in an inactive or idle mode, a request for a sidelink connection for a CHO of the second UE; establishing a fixed bearer of the sidelink connection with the second UE based at least in part on the request for the sidelink connection;

receiving, from the second UE via the fixed bearer, a connection reconfiguration complete message associated with a CHO of the second UE; transitioning, based at least in part on the request, from the inactive or idle mode to a connected mode; and forwarding the connection reconfiguration complete message to a serving base station of the first UE.

Aspect 18: The method of aspect 17, further comprising: relaying, base at least in part on the CHO of the second UE, data between the second UE and the serving base station of the first UE.

Aspect 19: A method for wireless communication at a target base station, comprising: receiving, for a UE, respective context information associated with a CHO procedure of the UE to a set of target relays being served by the target base station, wherein the context information comprises information used to establish a respective dedicated bearers between the UE and the target base station via each target relay in the set of target relays; transmitting the respective context information for the UE to each target relay in the set of target relays to support establishment of the respective dedicated bearers; receiving an indication of the CHO procedure of the UE to a target relay of the set of target relays; and transmitting a context release message to a subset of the target relays in the set of target relays including target relays other than the target relay to which the UE performed the CHO procedure.

Aspect 20: The method of aspect 19, further comprising: determining that a first target relay in the subset of the target relays is operating in a connected mode, wherein the context release message is transmitted based at least in part on the first target relay operating in the connected mode.

Aspect 21: The method of any of aspects 19 through 20, further comprising: determining that a first target relay in the subset of the target relays is operating in a connected mode, wherein the context release message is transmitted based at least in part on the first target relay operating in the connected mode.

Aspect 22: The method of any of aspects 19 through 21, further comprising: determining that the target relay is operating in an inactive or idle mode; and receiving a connection reconfiguration complete message from the target relay via a fixed bearer between the target base station and target relay, wherein the connection reconfiguration complete message is received via the fixed bearer based at least in part on the target relay operating in the inactive or idle mode.

Aspect 23: An apparatus for wireless communication at a UE, comprising a processor; memory coupled with the processor; and instructions stored in the memory and executable by the processor to cause the apparatus to perform a method of any of aspects 1 through 13.

Aspect 24: An apparatus for wireless communication at a UE, comprising at least one means for performing a method of any of aspects 1 through 13.

Aspect 25: A non-transitory computer-readable medium storing code for wireless communication at a UE, the code comprising instructions executable by a processor to perform a method of any of aspects 1 through 13.

Aspect 26: An apparatus for wireless communication at a serving base station, comprising a processor; memory coupled with the processor; and instructions stored in the memory and executable by the processor to cause the apparatus to perform a method of any of aspects 14 through 16.

Aspect 27: An apparatus for wireless communication at a serving base station, comprising at least one means for performing a method of any of aspects 14 through 16.

Aspect 28: A non-transitory computer-readable medium storing code for wireless communication at a serving base station, the code comprising instructions executable by a processor to perform a method of any of aspects 14 through 16.

Aspect 29: An apparatus for wireless communication at a first UE, comprising a processor; memory coupled with the processor; and instructions stored in the memory and executable by the processor to cause the apparatus to perform a method of any of aspects 17 through 18.

Aspect 30: An apparatus for wireless communication at a first UE, comprising at least one means for performing a method of any of aspects 17 through 18.

Aspect 31: A non-transitory computer-readable medium storing code for wireless communication at a first UE, the code comprising instructions executable by a processor to perform a method of any of aspects 17 through 18.

Aspect 32: An apparatus for wireless communication at a target base station, comprising a processor; memory coupled with the processor; and instructions stored in the memory and executable by the processor to cause the apparatus to perform a method of any of aspects 19 through 22.

Aspect 33: An apparatus for wireless communication at a target base station, comprising at least one means for performing a method of any of aspects 19 through 22.

Aspect 34: A non-transitory computer-readable medium storing code for wireless communication at a target base station, the code comprising instructions executable by a processor to perform a method of any of aspects 19 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like.

Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive a signal indicating respective execution conditions for a conditional handover procedure for each of one or more candidate handover groups, the one or more candidate handover groups comprising a candidate cell group and a candidate relay group, and each candidate handover group associated with a different priority level;
      select a handover candidate for performing the conditional handover procedure based at least in part on determining that the respective execution condition is satisfied for one or more handover candidates of the one or more candidate handover groups and on the respective priority levels of the one or more candidate handover groups; and
      perform the conditional handover procedure to the selected handover candidate.

2. The apparatus of claim 1, wherein the instructions are further executable by the processor to cause the apparatus to:
   receive a radio resource control message forwarded by a serving relay, the radio resource control message comprising an indication of the one or more candidate handover groups.

3. The apparatus of claim 2, wherein the instructions are further executable by the processor to cause the apparatus to:
identify, based at least in part on the indication, a first execution condition of the respective execution conditions for the candidate cell group and a second execution condition of the respective execution conditions for the candidate relay group, wherein the first execution condition is associated with a first measurement event and the second execution condition is associated with a second, different measurement event.

4. The apparatus of claim 2, wherein the instructions are further executable by the processor to cause the apparatus to:
identify, based at least in part on the indication, a first priority level for the candidate cell group and a second priority level for the candidate relay group.

5. The apparatus of claim 1, wherein the instructions are further executable by the processor to cause the apparatus to:
identify, based at least in part on monitoring a signal from one or more handover candidates in the one or more candidate handover groups, a receive power level for each of the one or more handover candidates; and
determine that the respective execution condition is satisfied based at least in part on the receive power level of the one or more handover candidates satisfying a threshold.

6. The apparatus of claim 5, wherein the instructions are further executable by the processor to cause the apparatus to:
determine, based at least in part on monitoring for a sidelink discovery reference signal, that the receive power level for one or more relays of the candidate relay group satisfy the threshold, wherein the conditional handover is performed based at least in part on the receive power level for the one or more relays satisfying the threshold.

7. The apparatus of claim 6, wherein the instructions are further executable by the processor to cause the apparatus to:
determine that the receive power level for a serving cell fails to satisfy a serving cell threshold, wherein the conditional handover is performed based at least in part on the receive power level for the one or more relays satisfying the threshold and the receive power for the serving cell failing to satisfy the serving cell threshold.

8. The apparatus of claim 5, wherein the instructions are further executable by the processor to cause the apparatus to:
determine, based at least in part on monitoring for a sidelink discovery reference signal, that the receive power level for a serving relay fails to satisfy a serving relay threshold, wherein the conditional handover is performed based at least in part on the receive power level for the serving relay failing to satisfying the serving relay threshold.

9. The apparatus of claim 8, wherein the instructions are further executable by the processor to cause the apparatus to:
determine, based at least in part on monitoring for a reference signal, that the receive power level for one or more handover candidates satisfy a threshold, wherein the conditional handover is performed based at least in part on the receive power level for the serving relay failing to satisfy the serving relay threshold and the receive power for the one or more handover candidates satisfying the threshold.

10. The apparatus of claim 5, wherein the instructions are further executable by the processor to cause the apparatus to:
determine, based at least in part on monitoring for a sidelink reference signal, that the receive power level for a serving relay fails to satisfy a serving relay threshold; and determine, based at least in part on monitoring for a sidelink discovery reference signal, that the receive power level for a candidate relay of the candidate relay group satisfies a threshold, wherein the conditional handover is performed based at least in part on the receive power level for the serving relay failing to satisfy the serving relay threshold and the receive power level for the candidate relay satisfying the threshold.

11. The apparatus of claim 1, wherein the instructions are further executable by the processor to cause the apparatus to:
refrain, based at least in part on the respective execution condition being satisfied, from performing transmissions to a source cell via a serving relay; and
transmit, to a target cell associated with a selected candidate relay, a handover complete message based at least in part on the conditional handover procedure being performed.

12. The apparatus of claim 11, wherein:
the handover complete message is transmitted to the target cell via the selected candidate relay while the selected candidate relay is operating in a connected mode, and
the handover complete message is transmitted over a dedicated sidelink bearer from the source cell.

13. The apparatus of claim 11, wherein:
the handover complete message is transmitted to the selected candidate relay for relaying to the target cell while the selected candidate relay is operating in an idle mode or an inactive mode, and
the handover complete message is transmitted over a fixed sidelink bearer.

14. An apparatus for wireless communication at a serving base station, comprising:
a processor;
memory coupled with the processor; and
instructions stored in the memory and executable by the processor to cause the apparatus to:
identify, for a user equipment (UE), one or more candidate handover groups for the UE for performing a conditional handover procedure, the one or more candidate handover groups comprising a candidate cell group and a candidate relay group, and each candidate handover group associated with a different priority level; and
transmit, to the UE, a signal indicating respective execution conditions for the conditional handover procedure for each of the one or more candidate handover groups.

15. The apparatus of claim 14, wherein the candidate relay group comprises one or more candidate relays, and the instructions are further executable by the processor to cause the apparatus to:
send, to a serving base station of the one or more candidate relays for forwarding to the one or more candidate relays and based at least in part on the one or more candidate relays operating in a connected mode, an identifier of the UE, an identifier of a serving cell, and a dedicated bearer configuration for a relay connection for the UE with the serving cell.

16. The apparatus of claim 14, wherein the candidate relay group comprises one or more candidate relays, and the instructions are further executable by the processor to cause the apparatus to:
transmit, to a serving base station of the one or more candidate relays and based at least in part on the one or more candidate relays operating in an inactive mode or an idle mode, an identifier of the UE and an identifier of a serving cell.

17. An apparatus for wireless communication at a first user equipment (UE), comprising:
  a processor;
  memory coupled with the processor; and
  instructions stored in the memory and executable by the processor to cause the apparatus to:
    receive, from a second UE and while operating in an inactive or idle mode, a request for a sidelink connection for a conditional handover of the second UE;
    establish a fixed bearer of the sidelink connection with the second UE based at least in part on the request for the sidelink connection;
    receive, from the second UE via the fixed bearer, a connection reconfiguration complete message associated with a conditional handover of the second UE;
    transition, based at least in part on the request, from the inactive or idle mode to a connected mode; and
    forward the connection reconfiguration complete message to a serving base station of the first UE.

18. The apparatus of claim 17, wherein the instructions are further executable by the processor to cause the apparatus to:
  relay, base at least in part on the conditional handover of the second UE, data between the second UE and the serving base station of the first UE.

19. An apparatus for wireless communication at a target base station, comprising:
  a processor;
  memory coupled with the processor; and
  instructions stored in the memory and executable by the processor to cause the apparatus to:
    receive, for a user equipment (UE), respective context information associated with a conditional handover procedure of the UE to a set of target relays being served by the target base station, wherein the context information comprises information used to establish a respective dedicated bearers between the UE and the target base station via each target relay in the set of target relays;

transmit the respective context information for the UE to each target relay in the set of target relays to support establishment of the respective dedicated bearers;
    receive an indication of the conditional handover procedure of the UE to a target relay of the set of target relays; and
    transmit a context release message to a subset of the target relays in the set of target relays including target relays other than the target relay to which the UE performed the conditional handover procedure.

20. The apparatus of claim 19, wherein the instructions are further executable by the processor to cause the apparatus to:
  determine that a first target relay in the subset of the target relays is operating in a connected mode, wherein the context release message is transmitted based at least in part on the first target relay operating in the connected mode.

21. The apparatus of claim 19, wherein the instructions are further executable by the processor to cause the apparatus to:
  determine that a first target relay in the subset of the target relays is operating in a connected mode, wherein the context release message is transmitted based at least in part on the first target relay operating in the connected mode.

22. The apparatus of claim 19, wherein the instructions are further executable by the processor to cause the apparatus to:
  determine that the target relay is operating in an inactive or idle mode; and
  receive a connection reconfiguration complete message from the target relay via a fixed bearer between the target base station and target relay, wherein the connection reconfiguration complete message is received via the fixed bearer based at least in part on the target relay operating in the inactive or idle mode.

* * * * *